(12) United States Patent
Uehara

(10) Patent No.: US 6,837,354 B2
(45) Date of Patent: Jan. 4, 2005

(54) DAMPER DISK ASSEMBLY

(75) Inventor: Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/437,007

(22) Filed: May 14, 2003

(65) Prior Publication Data

US 2003/0226734 A1 Dec. 11, 2003

(30) Foreign Application Priority Data

Jun. 7, 2002 (JP) ........................ 2002-166961
Dec. 16, 2002 (JP) ........................ 2002-364318

(51) Int. Cl.[7] ............................................. F16F 15/30
(52) U.S. Cl. .......................... 192/70.17; 192/213.22
(58) Field of Search ............................. 192/70.17, 212, 192/213.11, 213.12, 213.21, 213.22; 464/66, 68

(56) References Cited

U.S. PATENT DOCUMENTS 5,161,660 A * 11/1992 Huber ...................... 192/213.1
5,813,915 A * 9/1998 Imanaka ...................... 464/68

* cited by examiner

Primary Examiner—Saul Rodriguez
(74) Attorney, Agent, or Firm—Shinjyu Global IP Counselors, LLP

(57) ABSTRACT

A clutch disk assembly 1 has a pair of axially facing plates 12 and 13. A relatively rotatable flange 8 is provided between the plates 12 and 13. A first elastic member 30 exhibits high rigidity on the positive side of the torsional characteristics. A second elastic member 31 is provided to operate in parallel with first elastic member 30 to realize a low rigidity on the negative side of the torsional characteristics. The stop pins 22 affix plates 12 and 13 together. The stop pins 22 and notches 8c are provided on the outer periphery of the flange 8 constitute a stopper mechanism 86 for regulating the relative rotation between the plates 12 and 13 and the flange 8. The stopper mechanism 86 is located on radially outside the second elastic members 31. The stop pins 22 are movable on the outer periphery of the second elastic members 31.

26 Claims, 28 Drawing Sheets

DAMPER DISK ASSEMBLY

BACKGROUND OF THE INVENTION

1. Field of the Invention

The present invention generally relates to a damper disk assembly. More specifically, the present invention relates to a damper disk assembly for absorbing and attenuating torsional vibrations while transmitting torque.

2. Background Information

A clutch disk assembly used on a vehicle has a clutch function and damper function. The clutch function is provided to facilitate connecting to and disconnecting from a flywheel. The damper function is provided to facilitate absorbing and attenuating torsional vibrations transmitted from the flywheel. Generally speaking, vibrations on a vehicle include idling noises (rattling), driving noises (acceleration/deceleration rattling, droning), and tip-in/tip-out or low frequency vibrations. Part of the damper function of the clutch disk assembly is provided to prevent these noises and vibrations.

The idling noises relate to a rattling sound generated in the transmission that typically occurs when a driver shifts into neutral while waiting for the traffic signal to turn green, and releases the clutch pedal. The reason for this noise is due to a large torque fluctuation that occurs when the engine combusts as the engine torque remains low at the engine idling speed. At such a moment, the input gear and the counter gear in the transmission are subject to a tooth beating phenomenon.

Tip-in/tip-out or low frequency vibrations are due to a large body sway that occurs when the acceleration pedal is abruptly engaged and then released. When the rigidity of the drivetrain is low, a torque, which is transmitted to the tires, is fed backward from a tire side to the torque, and a backlash phenomenon results causing an excessive torque on the tires, which then results in a large transient forward/backward vibration of the body.

Concerning the idling noise, critical torsional characteristics of the clutch disk assembly are in the zero torque neighborhoods. The torque therein should be as low as possible. On the other hand, it is necessary to make the torsional characteristics of the clutch disk assembly as rigid as possible in order to suppress the forward/backward vibration in the tip-in/tip-out phenomenon. In order to solve problems mentioned above, clutch disk assemblies with two stage characteristics having two kinds of spring members have been provided. In such a design, the torsional rigidity and the hysteresis torque in the first stage of the torsional characteristics (low torsional angle region) are kept low in order to achieve a noise suppression effect when idling. Since the torsional rigidity and the hysteresis torque are set high in the second stage of the torsional characteristics (high torsional angle region), the forward/backward vibration in tip-in/tip-out phenomenon can be sufficiently attenuated. Furthermore, a damper mechanism is also known which effectively absorbs minute torsional vibration in the second stage of the torsional characteristics by means of preventing the second stage large friction mechanism from operating when minute torsional vibrations resulting from fluctuations of engine combustion are supplied.

In general, it is desirable to have different rigidities on the positive side (acceleration side) and the negative side (deceleration side) of the torsional characteristics. More specifically, it is preferable to have a relatively high rigidity on the positive side and a relatively low rigidity on the negative side. This is because that with such characteristics it is possible to suppress the fluctuation of the rotating speed when passing through the resonance point on the positive side of the torsional characteristics. Furthermore, it is also possible to achieve a good attenuation ratio for the entire range on the negative side of the torsional characteristics. As a suitable mechanism for achieving such characteristics, a damper mechanism has been known, in which the number of elastic members to be compressed on the positive side is structured to be less than the number of elastic members to be compressed on the negative side. Separate from that, another damper mechanism is known, which uses different kinds of elastic members to be compressed on the positive side and the negative side, and in which the rigidity of the elastic members compressed on the negative side is structured to be lower than that of the elastic members compressed on the positive side. In the latter case, a gap in the rotational direction is secured on one rotational direction side of the elastic member, which is compressed on the positive side. The gap is secured between the elastic member and the supporting member in order to prevent the elastic member from being compressed on the negative rotational side.

As mentioned above, the damper mechanism having different rigidities on the positive and negative sides in terms of the torsional characteristics matching the engine vibration characteristics is equipped with a plurality of elastic members arranged side by side in the rotational direction. These elastic members are installed in window parts of each circular disk member. A torsion angle stopper that restricts the relative rotation of the rotating members has pin members that affix a pair of circular disk members and protrusions provided on the outer periphery of a circular member placed between the pair of circular disk members. Each pin member is placed within a notched area formed between each protrusion and is movable in the rotational direction.

As each torsional stopper is located in the rotational direction between the elastic members, the length of the notched area is limited and it is difficult to provide a sufficient torsional angle, which in turn makes it difficult to broaden the damper torsional angle.

In view of the above, it will be apparent to those skilled in the art from this disclosure that there exists a need for an improved damper disk assembly that absorbs and attenuates torsional vibrations while transmitting torque. This invention addresses this need in the art as well as other needs, which will become apparent to those skilled in the art from this disclosure.

SUMMARY OF THE INVENTION

An object of the present invention is to provide a simple means of broadening the torsional angle in a damper mechanism, which has different rigidities on the positive and negative sides in terms of the torsional characteristics to match the engine vibration characteristics.

A damper disk assembly in accordance with a first preferred aspect of the present invention has a pair of first circular disk members, a second circular disk member, first elastic members, second elastic members, and pin members. The pair of first circular disk members is axially affixed to face each other. The second circular disk member is provided between the pair of first circular disk members in such a way as to be able to rotate relative to the pair of first circular disk members. The first elastic members are provided to connect elastically the first circular disk members with the second circular disk member in the rotating direction thus realizing a high rigidity on the positive side of the torsion characteristics. The second elastic members are provided to connect elastically the first circular disk members with the second circular disk member in the rotating direction thus realizing a low rigidity on the negative side of the torsion characteristics. The second elastic members are placed parallel to the first elastic members in the rotating direction. The pin members are provided to the pair of first circular disk members together. The pin members and stoppers are provided on the outer periphery of the second circular disk member and form torsional angle stoppers for limiting the relative rotation between the first circular disk members and the second circular disk member. The radial position of the torsional angle stoppers is located outward relative to the second elastic members. Further, the pin members are movable on the radially outside of the second elastic members.

The torque is transmitted between the pair of first circular disk members and the second circular disk member via the first elastic members and the second elastic members in this damper disk assembly. When a torsional vibration enters into the damper disk assembly, relative rotation occurs between the first circular disk members and the second circular disk member causing compressions of the first elastic members and the second elastic members in a rotational direction. As a result, the torsional vibrations are absorbed and attenuated.

In this damper disk assembly, the first elastic members are compressed to provide high rigidity characteristics on the positive side (acceleration side) of the torsional characteristics and the second elastic members are compressed to provide low rigidity characteristics on the negative side (deceleration side) of the torsional characteristics. As a result, it is possible to suppress the fluctuations of the rotating speed when passing through the resonance point on the positive side of the torsional characteristics, while it is also possible to achieve a good attenuation ratio for the entire range on the negative side of the torsional characteristics. In particular, the radial positions of the torsional angle stoppers are located outward relative to the second elastic members in the radial direction. Further, the pin members are movable on the radially outward side of the second elastic members. In other words, since the torsional angle stoppers are not located between the first elastic members and the second elastic members in the rotational direction, it is relatively easy to achieve a wide torsional angle for the damper.

A damper disk assembly in accordance with a second preferred aspect of the present invention is the assembly of the first aspect, wherein the positive side of the torsion characteristics has a first region wherein only the first elastic members are compressed. Further, the damper disk assembly has a second region, which is a region with a larger torsion angle compared to that in the first region, wherein the first elastic members and the second elastic members are compressed in parallel. This damper disk assembly has a first region and a second region on the positive side of the torsional characteristics, thus realizing a multi-stage feature on the positive side of the torsional characteristics.

A damper disk assembly in accordance with a third preferred aspect of the present invention is the assembly of the first or second aspect, wherein the negative side of the torsion characteristics has a third region wherein only the second elastic members are compressed. Further, the damper disk assembly has a fourth region, which is a region with a larger torsion angle compared to that in the third region, wherein the first elastic members and the second elastic members are compressed in parallel. This damper disk assembly has a third region and a fourth region on the negative side of the torsional characteristics, thus realizing a multi-stage feature on the negative side of the torsional characteristics.

A damper disk assembly in accordance with a fourth preferred aspect of the present invention is the assembly of any one of the first to third aspects, wherein a friction generating mechanism having a friction generating unit that generates a specified friction, and a friction suppressing unit that prevents the friction generating unit from operating in a minute torsion angle range on the negative side of the torsion characteristics. This damper disk assembly generates friction in the friction generating unit for torsional vibrations with large amplitudes such as back and forth vibrations of the vehicle and attenuates the vibrations in the negative side of the torsional characteristics. On the other hand, it does not generate friction as the friction suppressing unit prevents the friction generating unit from operating for minute torsional vibrations that occur during normal deceleration. Consequently, it can prevent any degradation of the attenuation performance due to friction.

As can be seen from the above, only the negative side of the torsional characteristics does not generate high hysteresis torques for minute torsional vibrations. Thus, the use of this damper disk assembly on, for example, a FF (front engine and front drive) car in which resonance peaks remain in the practical rotation range, makes it possible to reduce resonance peaks on the positive side of the torsional characteristics and maintain a low noise level of the negative side, while maintaining the tip-in/tip-out attenuation function.

A damper disk assembly in accordance with a fifth aspect of the present invention is the assembly of the first to fourth aspects, wherein the assembly has an intermediate rotating member that frictionally engages with the pair of first circular disk members. Further, the damper disk assembly has a low rigidity elastic member that is placed radially inward relative to the second elastic member. The low rigidity elastic member connects the intermediate rotating member with the second circular disk member in the rotating direction. This damper disk assembly provides a low rigidity region on both sides of the torsional angle zero degree area of the torsional characteristics due to the low rigidity elastic member. Consequently, high vibration absorption effects can be realized for minute torsional vibrations during idling. In this case, an excellent space saving effect is achieved as the low rigidity elastic member is provided inside the second elastic members in the radial direction.

A damper disk assembly in accordance with a sixth aspect of the present invention is the assembly of the fifth aspect, wherein the intermediate rotating member has a supporting part that supports both ends of the low rigidity elastic member in the rotating direction. Since the intermediate rotating member supports the low rigidity elastic member in the rotational direction, this damper disk assembly has a fewer number of parts and a simpler structure than conventional damper disk assemblies.

A damper disk assembly in accordance with a seventh aspect of the present invention is the assembly of the sixth aspect that also has a friction member that generates friction when the intermediate rotating member rotates relative to the second circular disk member. In this damper disk assembly, the friction member generates friction when relative rotation occurs between the intermediate rotating member and the second circular disk member. Consequently, a proper hysteresis torque is realized in the first stage of the torsional characteristics in which the low rigidity elastic members are compressed.

A damper disk assembly in accordance with an eighth aspect of the present invention is the assembly of the seventh aspect that also has a spring member that is used as the friction member. Since a single component spring member is used as the friction member, this damper disk assembly has a smaller number of parts.

A damper disk assembly in accordance with a ninth aspect of the present invention is the assembly of the eighth aspect, wherein a plate spring is used as said friction member. Since a plate spring is used as the friction member, this damper disk assembly provides an excellent space saving effect.

A damper disk assembly in accordance with a tenth aspect of the present invention is the assembly of the seventh to ninth aspects, wherein a rotational direction gap is provided in order to prevent the friction member from operating within the range of relative rotation between the intermediate rotating member and the second circular disk member. Since a rotation direction gap is provided in this damper disk assembly, the friction member does not operate in the first stage of the torsional characteristic, in which the low rigidity elastic member is compressed, as long as it is within its torsional angle range. Therefore, a high efficiency is realized when absorbing minute torsional vibrations in the vicinity of the neutral point.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

1. First Embodiment (1) Overall Constitution

Figure 1:
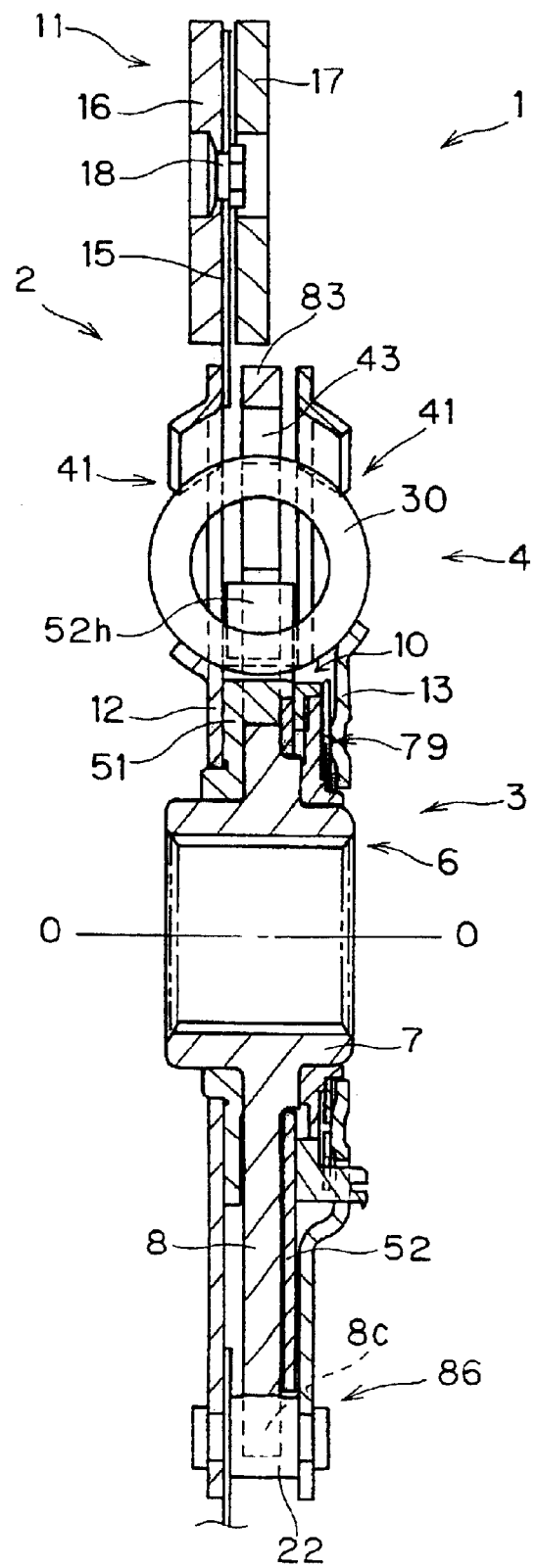
FIG. 1 is a vertical cross-sectional view of a clutch disk assembly in accordance with a first embodiment of the present invention, taken from the angle I-O-I in FIG. 3.
Figure 2:
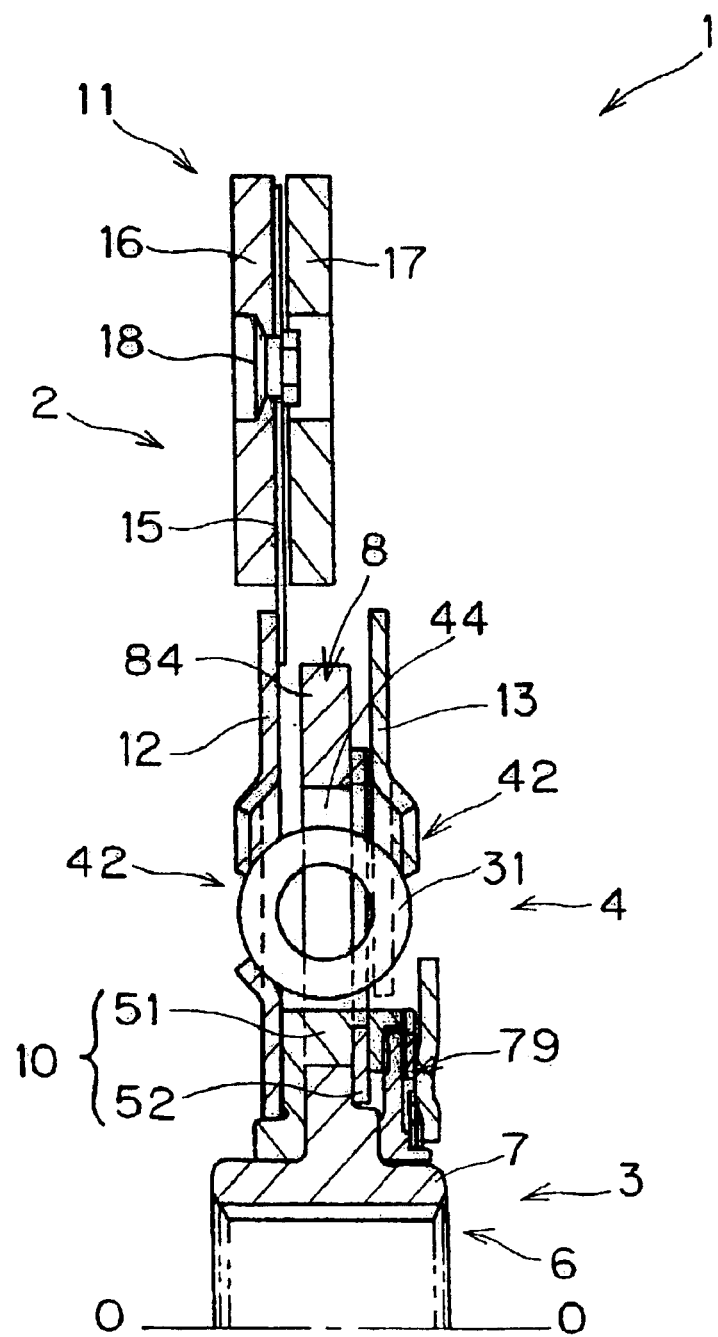
FIG. 2 is a vertical cross-sectional view of the clutch disk assembly in accordance with the first preferred embodiment of the present invention, taken from line segment O-I in FIG. 3.
Figure 3:
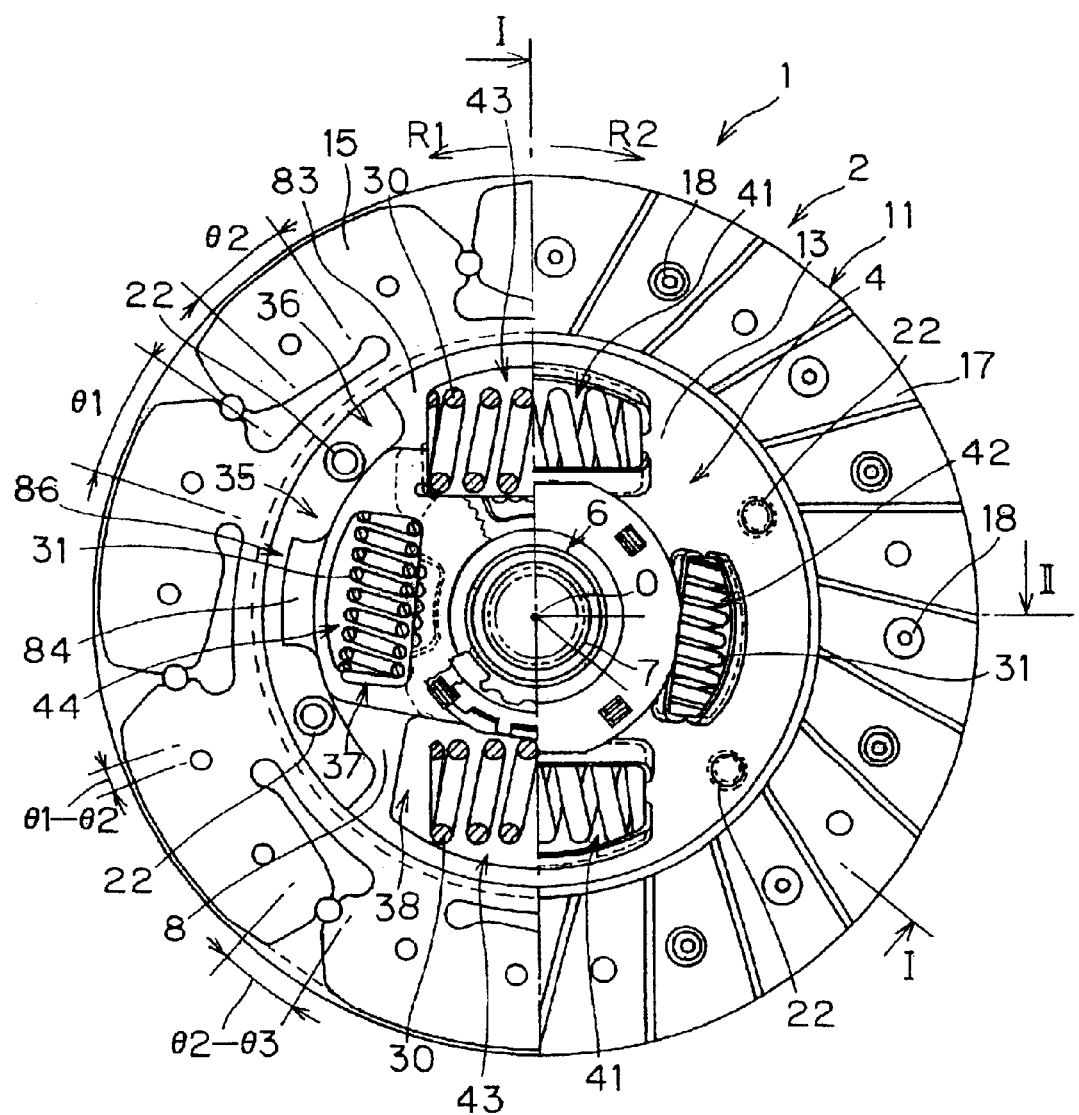
FIG. 3 is an elevational view of the clutch disk assembly of FIG. 1 with sections removed for illustrative purposes.

FIG. 1 and FIG. 2 are cross-sectional views of a clutch disk assembly 1, in accordance with a preferred embodiment of the present invention, and FIG. 3 is an elevational view thereof. The clutch disk assembly 1 is a power transmitting device used in a clutch device of a vehicle (especially a FF car). The clutch disk assembly has a clutch function and a damper function. The clutch function is provided to transmit and interrupt torque by means of connecting and disconnecting with a flywheel (not shown). The damper function is provided to absorb and attenuate torque fluctuations supplied from the flywheel side by means of springs, etc. In FIG. 1 and FIG. 2, O-O represents the rotating axis of the clutch disk assembly 1. The engine and the flywheel (not shown) are located on the left side of FIG. 1, and a transmission (not shown) is located on the right side of FIG. 1. Arrow R1 in FIG. 3 represents the drive side or positive rotational direction of the clutch disk assembly 1, while arrow R2 represents its opposite side or negative rotational side. Unless otherwise indicated, the "rotational (circumferential) direction," the "axial direction," and the "radial direction" mean each direction of the clutch disk assembly 1 as a rotating member in the following explanation. As seen in FIG. 1, the clutch disk assembly 1 primarily includes an input rotational member 2, an output rotational member 3, and an elastic connection mechanism 4 located between the two rotational members 2 and 3. Also, these members constitute a damper mechanism that attenuate torsional vibrations while transmitting torque as well.

(2) Input Rotational Member

The input rotational member 2 is a member that receives torque from the flywheel (not shown). The input rotational member 2 primarily includes a clutch disk 11, a clutch plate 12, and a retaining plate 13. The clutch disk 11 connects with the flywheel (not shown) when it is pressed against the flywheel. The clutch disk 11 includes a cushioning plate 15 and a pair of friction facings 16 and 17 that are affixed on both sides thereof in the axial direction by means of rivets 18.

Figure 11:
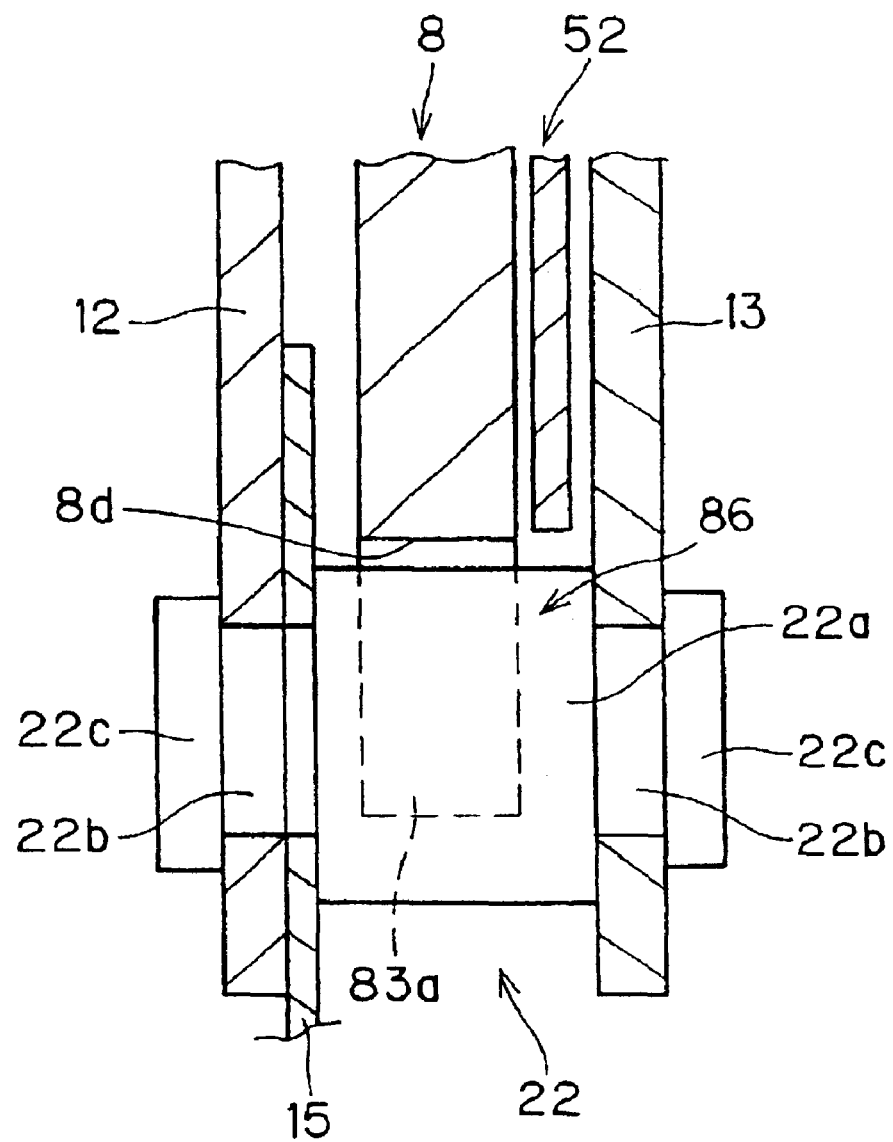
FIG. 11 is another enlarged fragmentary view of FIG. 1 illustrating a torsional angle stopper of the clutch disk assembly of FIG. 1.

The clutch plate 12 and the retaining plate 13 are preferably both metallic circular and annular members and are arranged to maintain a certain distance between them in the axial direction. The clutch plate 12 is placed on the engine side of the assembly in the axial direction, and the retaining plate 13 is placed on the transmission side of the assembly in the axial direction. Stop pins 22 are provided on the outer periphery of the retaining plate 13 at multiple, preferably four, places, which are equally spaced in the circumferential direction. The stop pins 22 are cylindrical members extending in the axial direction. As shown in FIG. 11, each stop pin 22 has a barrel part 22a, neck parts 22b, and heads 22c. The barrel part 22a is interposed between the plates 12 and 13 in the axial direction. The neck parts 22b extend from both ends of the barrel part 22a. The neck parts 22b are arranged in apertures of the plates 12 and 13. The heads 22c abut with the axial outer sides of the plates 12 and 13 in the axial direction. At least one of the heads 22c is formed by caulking. This arrangement allows the clutch plate 12 and retaining plate 13 to rotate together and determines the axial distance between them. As seen in FIG. 1, the stop pins 22 affix the inner periphery of the cushioning plates 15 to the outer periphery of the clutch plate 12. The pin members of this invention are not limited in the structure or the shape of the stop pins 22 shown here.

Each of the clutch plate 12 and the retaining plate 13 has a center hole. A boss 7, to be described later, is placed inside the center hole. As seen in FIG. 3, the clutch plate 12 and the retaining plate 13 are each provided with multiple windows 41 and 42 formed in the circumferential direction. The windows 41 and 42 have identical shapes and they are formed at multiple, preferably four, places, which are equally spaced in the circumferential direction. Each of the windows 41 and 42 has a shape extending substantially in the circumferential direction.

Figure 7:
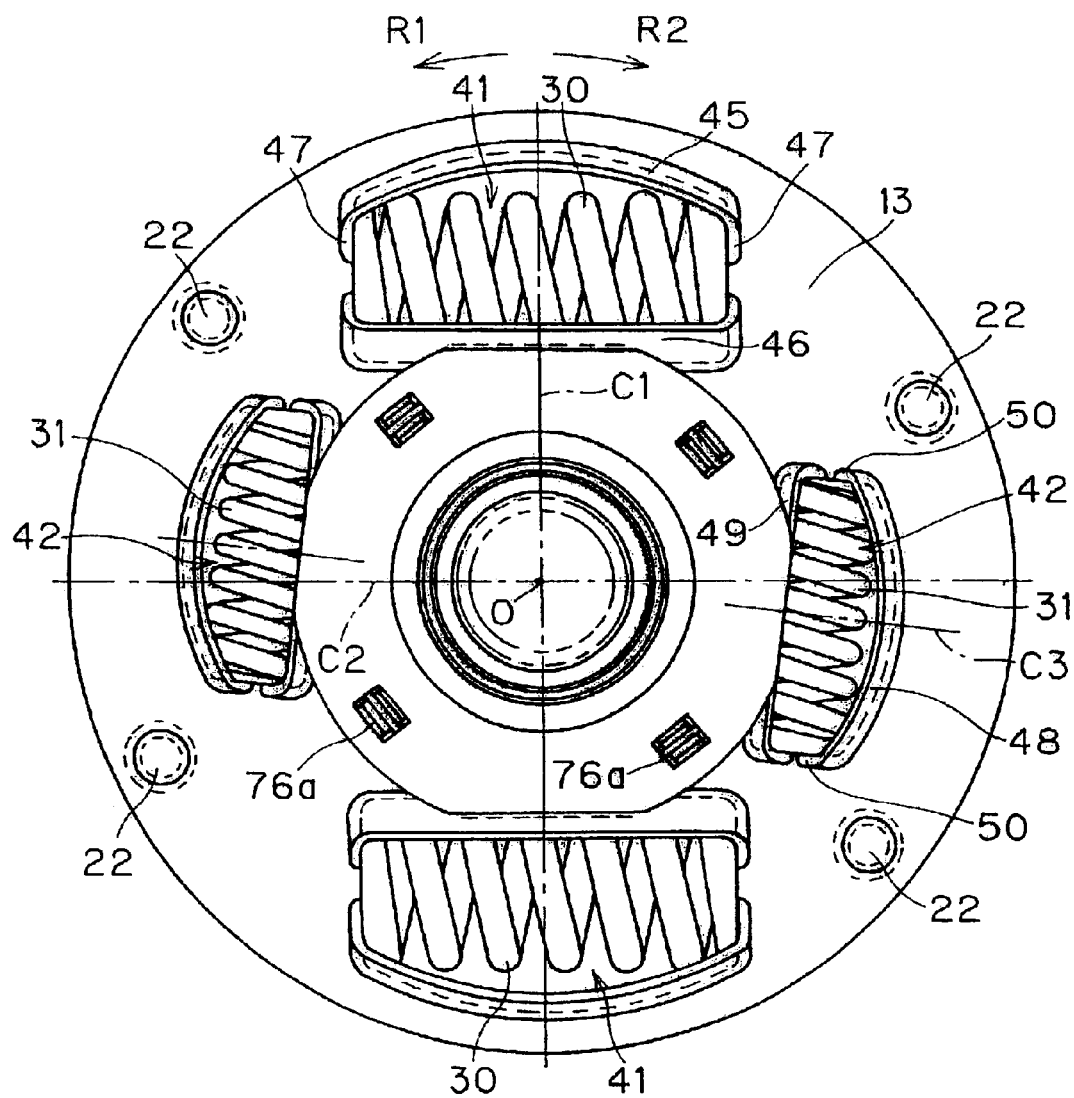
FIG. 7 is an elevational view of a retaining plate of the clutch disk assembly of FIG. 1.

The pair of windows 41 located apart from each other in the vertical direction in FIG. 3 will hereinafter be referred to as first windows 41, and the pair of windows located apart from each other in the horizontal direction in FIG. 3 will be referred to as second windows 42. As shown in FIG. 7, the windows 41 and 42 are made of a hole penetrating in the axial direction and a support part formed along the hole periphery. The supporting part of the first windows 41 has an outer periphery supporting part 45, an inner periphery supporting part 46, and a rotational direction supporting part 47. In an elevational view, the outer periphery supporting part 45 is curved substantially in the circumferential direction, while the inner periphery supporting part 46 extends substantially straight in the circumferential direction. The rotational direction supporting part 47 extends substantially straight in the radial direction, and is preferably parallel to a straight line passing through the center of the first windows 41 and the center O of the clutch disk assembly 1. The outer periphery support part 45 and the inner periphery support part 46 are both formed by raising other parts of the plate 12 or 13 in the axial direction.

The supporting part of the second windows 42 has an outer periphery supporting part 48, an inner periphery supporting part 49, and a rotational direction supporting part 50. In an elevational view, the outer periphery supporting part 48 is curved substantially in the circumferential direction, while the inner periphery supporting part 49 extends substantially straight in the circumferential direction. If a straight line connecting the centers of the first windows 41 in the rotational direction is called C1 and a straight line perpendicular to it is called C2 as shown in FIG. 7, straight line C3 connecting the centers of the second windows 42 in the rotational direction is preferably offset by a certain angle relative to straight line C2 by a certain angle on the rotational direction R2 side. In other words, each second window 42 is closer to the first window 41 on the rotational direction R2 side than the first window 41 on the rotational direction R1 side. The second windows 42 are shorter than the first windows 41 both in terms of the rotational direction length and the radial direction width. Moreover, the inner radius of the second windows 42 is substantially equal to the inner radius of the first windows 41, but the outer diameter of the second windows 42 is smaller than the outer diameter of the first windows 41.

The positions of the stop pins 22 on the plates 12 and 13 will be described. The stop pins 22 are provided on the outer peripheries of the plates 12 and 13 and between the windows 41 and 42 in the rotational direction. More specifically, the stop pins 22 are located closer to the second windows 42 rather than in a midpoint between the windows 41 and 42. The radial positions of the stop pins 22 are outward those of the outer edges of the second windows 42, although the radial positions of the stop pins 22 are inward those of the outer edges of the first windows 41. More specifically, the radial positions of the innermost points of the stop pins 22 are still radially outward those of the outer edges of the second windows 42.

(3) Output Rotational Member

Figure 8:
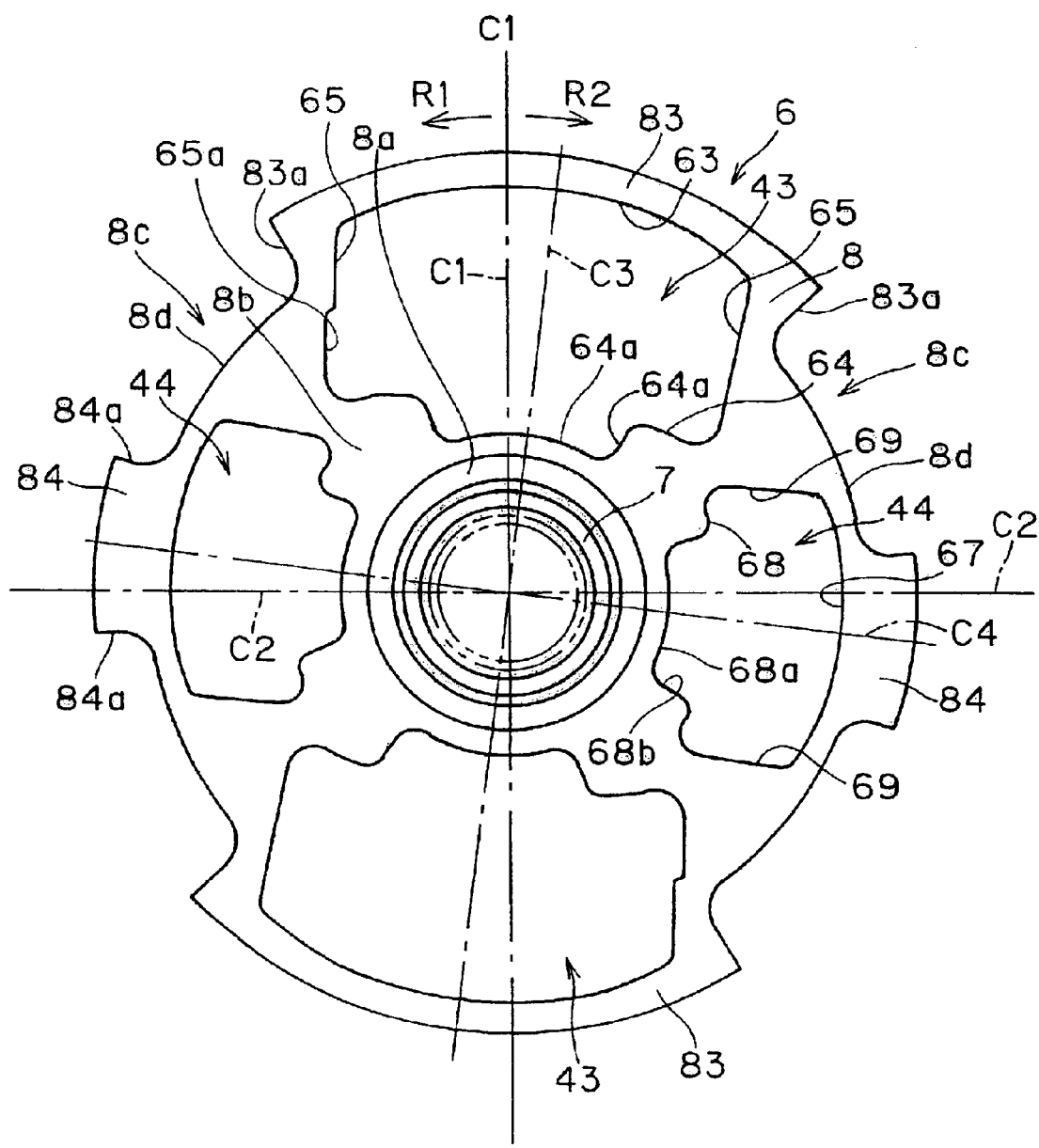
FIG. 8 is an elevational view of a hub of the clutch disk assembly of FIG. 1.

Referring to FIG. 1, the output rotational member 3 is provided to receive torque from the input rotational member 2 via the elastic connection mechanism 4 and to supply the torque to the transmission input shaft (not shown). The output rotational member 3 primarily includes a hub 6. As shown in FIG. 8, the hub 6 is made of a boss 7 and a flange 8. Referring again to FIG. 1, the boss 7 is a tube like member placed in the center holes of the clutch plate 12 and the retaining plate 13. The boss 7 forms a spline engagement with the transmission input shaft (not shown) inserted into its center hole. The flange 8 is a circular disk shape part formed integrally with the boss 7 on its outer periphery and extends radially outward. The flange 8 is located between the clutch plate 12 and the retaining plate 13 in the axial direction. As seen in FIG. 8, the flange 8 includes an inner periphery part 8a located near the boss 7, and an outer periphery part 8b, which is a part thinner than the inner periphery part 8a, provided on the radial outside thereof.

Window openings 43 and 44 are formed on the outer periphery 8b of the flange 8 in places corresponding to the windows 41 and 42. In other words, multiple, preferably four, window openings 43 and 44 are formed in the circumferential direction at the same radial positions as the windows 41 and 42. The pair of window openings 43 located opposite each other in the vertical direction in FIG. 8 will be called first window openings 43, and the pair of window openings 44 located opposite each other in the horizontal direction in FIG. 8 will be called second window openings 44. Each window opening 43 is an opening punched through axially and extends in the circumferential direction. Each window opening 43 has an outer periphery supporting part 63, an inner periphery supporting part 64, and a rotational direction supporting part 65. In an elevational view, the outer periphery supporting part 63 and the inner periphery supporting part 64 are curved in the circumferential direction. The rotational direction supporting part 65 extends substantially straight in the radial direction and, more specifically, the rotational direction supporting part 65 is parallel or substantially parallel to a straight line connecting the center of the window opening 43 in the rotational direction and the center O of the clutch disk assembly 1. The rotational direction supporting part 65 on the rotational direction R1 side has a rotational direction concave part 65a formed on the inner periphery side thereof.

The rotational direction concave part 65a is slightly indented toward the rotational direction R1 side relative to the part on the outer periphery side. A radial direction concave part 64a is formed in the middle of the inner periphery supporting part 64 in the rotational direction. The radial direction concave part 64a is indented toward the inside of the radius direction relative to both sides in the rotational direction. The first windows 41 are shorter than the first window openings 43 in the rotational direction and are offset toward the rotational direction R1 side of the first window opening 43. Consequently, as seen in FIGS. 3, 7, and 8, although the rotational direction supporting part 47 of the first window 41 on the rotational direction R1 side coincides with the rotational direction supporting part 65 of first window opening 43 on the rotational direction R1 side, the rotational direction supporting part 47 of the first window 41 on the rotational direction R2 side secures a fourth rotational gap 38 between it and rotational direction supporting part 65 of first window opening 43 on the rotational direction R2 side.

As seen in FIG. 8, the second window opening 44 is an opening punched through axially and extends in the circumferential direction. Each window opening 44 has an outer periphery supporting part 67, an inner periphery supporting part 68, and a rotational direction supporting part 69. In an elevational view, the outer periphery supporting part 67 and the inner periphery supporting part 68 are curved in the circumferential direction. The rotational direction supporting part 69 extends preferably substantially straight along the radial direction and, more specifically, the rotational direction supporting part 69 is parallel to a straight line connecting the center of the second window opening 44 in the rotational direction and the center O of the clutch disk assembly 1. A radius direction concave part 68a is formed in the middle of the inner periphery supporting part 68. The radius direction concave part 68a is indented toward the inside of the radius direction relative to both sides in the rotational direction. The second windows 42 are shorter than the second window openings 44 in the rotational direction and are offset toward the rotational direction R2 side of the second window openings 44. Consequently, as seen in FIGS. 3, 7, and 8, although the rotational direction supporting part 50 of the second window 42 on the rotational direction R2 side coincides with the rotational direction supporting part 69 of the second window opening 44 on the rotational direction R2 side, the rotational direction supporting part 50 of the second window 42 on the rotational direction R1 side secures a third rotational gap 37 between it and the rotational direction supporting part 69 of the second window opening 44 on the rotational direction R1 side.

Referring to FIGS. 3 and 8, the notches 8c are formed on the outer periphery of the flange 8 so that the stop pins 22 pass therethrough in the axial direction. Each notch 8c is located between each pair of window openings 43 and 44 in the rotational direction. Further, the stop pins 22 are movable therein in the rotational direction. The notches 8c are formed by radial direction protrusions 83 where the first window openings 43 are formed and the radial direction protrusions 84 on the outside of the second window opening 44. In other words, each notch 8c is formed by an outer edge 8d of the flange 8, and the rotational direction surfaces 83a and 84a of the protrusions 83 and 84, respectively. When viewed from the stop pins 22, a first rotational gap 35 is secured between the stop pins 22 and the rotational direction surfaces 83a and 84a on the rotational direction R1 side, while a second rotational gap 36 is defined between the stop pins 22 and the rotational direction surfaces 83a and 84a on the rotational direction R2 side. Thus, the stop pins 22, protrusions 83 and 84, and the notches 8c constitutes a stopper mechanism 86 of the clutch disk assembly 1.

Each protrusion 84 is formed in correspondence with one of the second window openings 44. Further, the center of the protrusion 84 and each second window opening 44 coincides with each other in the rotational direction. However, since the protrusion 84 has a shorter rotational direction length compared to the second window opening 44, the rotational direction surfaces 84a are located inside of the rotational direction supporting parts 69 in the rotational direction. Thus, the notches 8c circumferentially extend up to a portion of the outer periphery side of the second window openings 44, so that the stop pins 22 can be arranged to move to a place radially outward of the second window openings 44. In other words, the stopper mechanism 86 (more specifically the stop pins 22) does not interfere with the second window openings 44 in the rotational direction. Consequently, the torsionally allowable angle of the stopper mechanism 86 is larger compared with that of prior art mechanisms.

(4) Elastic Connection Mechanism

As seen in FIG. 1, the elastic connection mechanism 4 is provided to transmit torque from the input rotational member 2 to the output rotational member 3 and to absorb and attenuate torsional vibrations. As seen in FIG. 3, the elastic connection mechanism 4 is made of a plurality of elastic members 30 and 31. This embodiment preferably uses four elastic members 30 and 31. Each of the elastic members 30 and 31 is provided in the first and second window openings 43 and 44 as well as the first and second windows 41 and 42. The elastic members 30 and 31 are preferably made of two kinds of elastic members, i.e., first elastic members 30 placed in the first window openings 43 and the first windows 41 and second elastic members 31 placed in the second window openings 44 and the second windows 42.

The first elastic members 30 are preferably coil springs that extend in the rotational direction. As seen in FIGS. 3, 7, and 8, both ends of the coil springs are supported in the rotational direction by both rotational direction supporting parts 47 of the first windows 41. Therefore, the first elastic members 30 are placed offset toward the rotational direction R1 side in the first window openings 43. More specifically, the rotational direction R1 side end of the first elastic member 30 abuts or is close to the rotational direction supporting part 65 of the first window opening 43, but the rotational direction R2 side end of the first elastic member 30 secures the fourth rotational direction gap 38 between it and the rotational direction supporting part 65 of the first window opening 43.

The second elastic members 31 are preferably coil springs that extend in the rotational direction and are smaller in the rotational length and coil diameter, and have a smaller spring constant (lower rigidity) compared to the first elastic members 30. Both ends of the second elastic member 31 coil springs are supported in the rotational direction by both rotational direction supporting parts 50 of the second window openings 42. Therefore, the second elastic members 31 are placed offset toward the rotational direction R2 side in the second window openings 44. More specifically, the rotational direction R2 side end of the second elastic member 31 abuts or is close to the rotational direction supporting part 50 of the second window opening 44, but the rotational direction R1 side end of the second elastic member 31 secures the third rotational direction gap 37 between it and the rotational direction supporting part 69 of the second window opening 44.

(5) Intermediate Rotating Member

Figure 4:
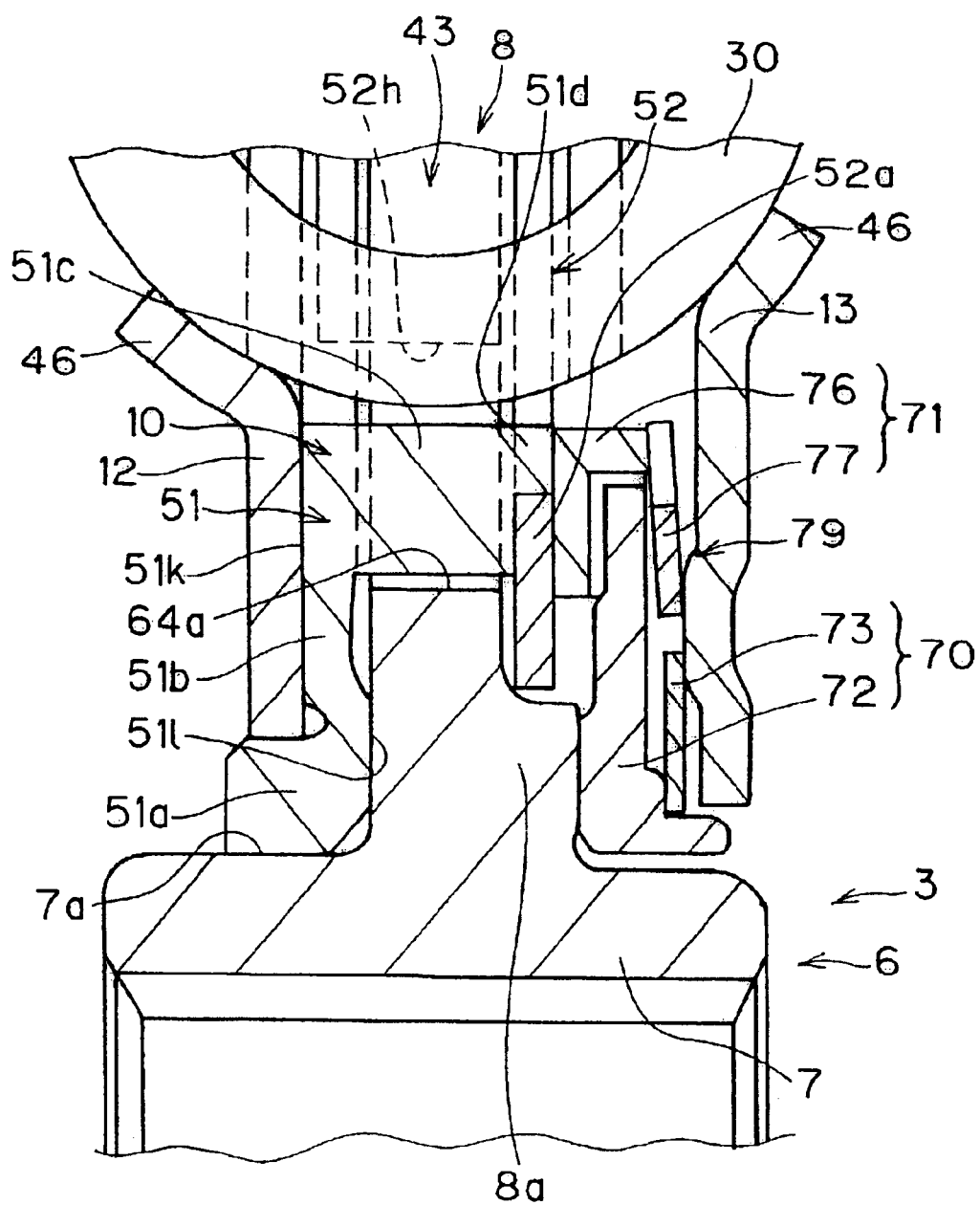
FIG. 4 is an enlarged fragmentary view of FIG. 1 illustrating a vertical cross-section of a friction generating mechanism of the clutch disk assembly.
Figure 5:
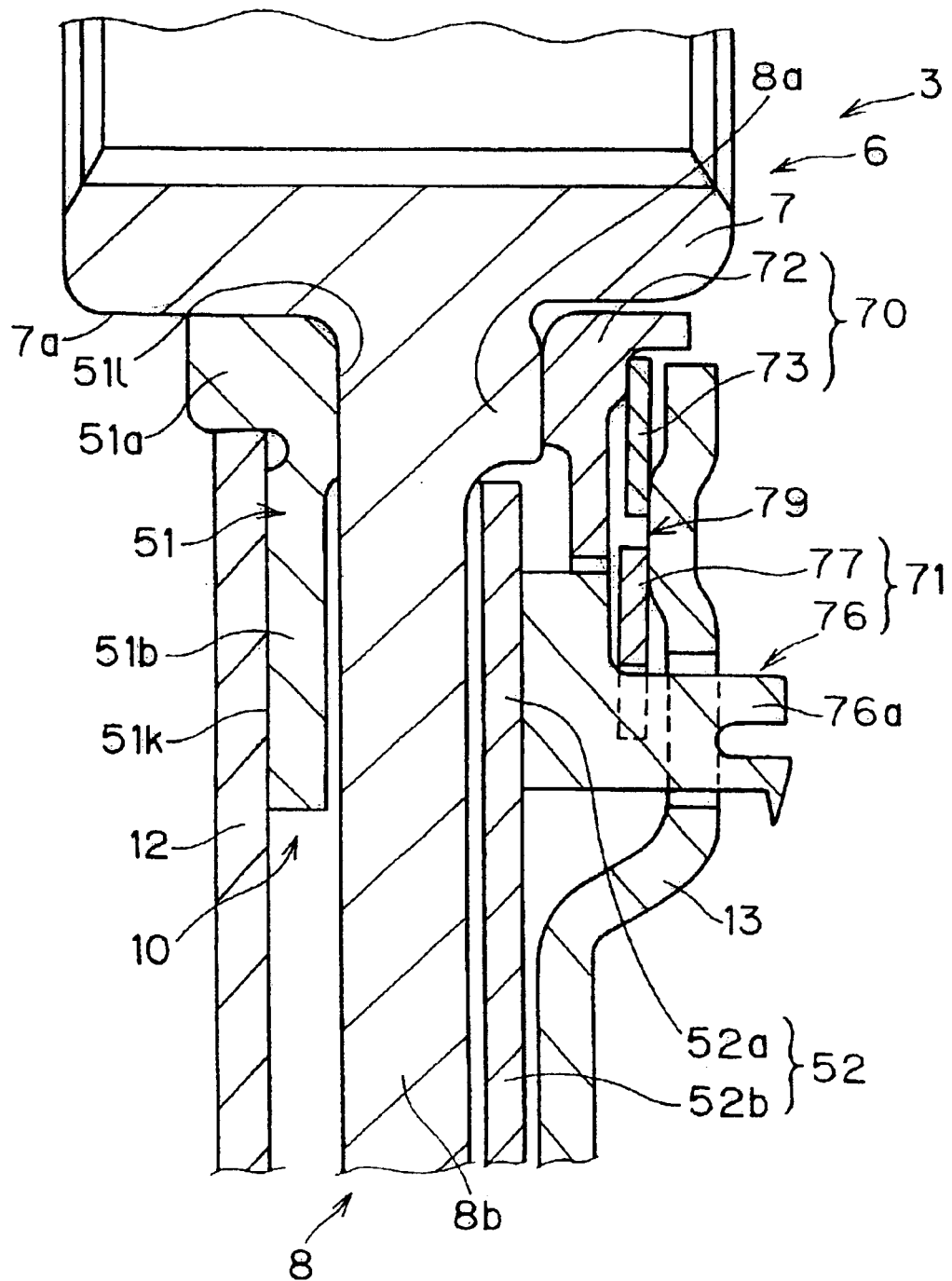
FIG. 5 is an alternate enlarged fragmentary view of FIG. 1 illustrating a vertical cross-section of the friction generating mechanism.
Figure 6:
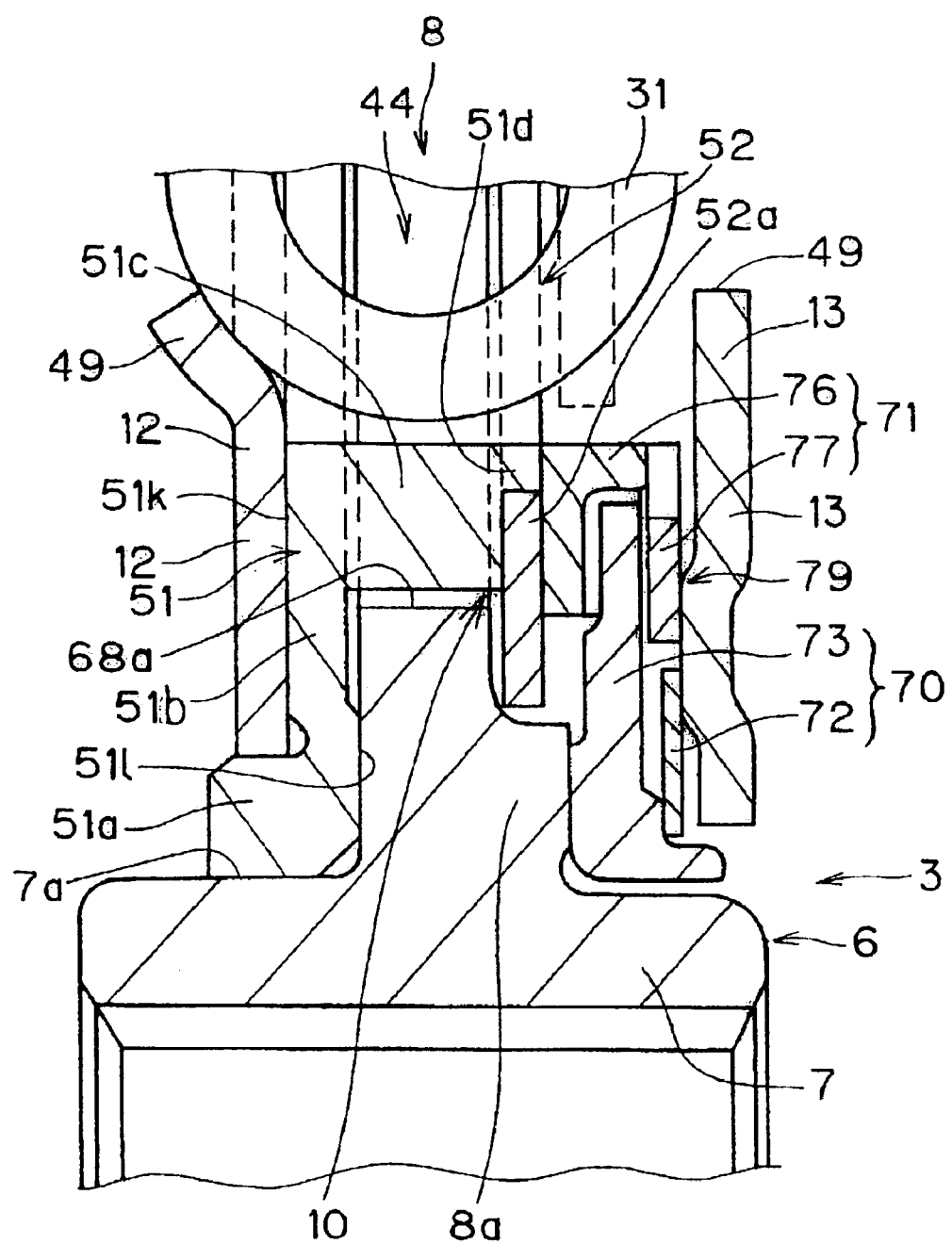
FIG. 6 is an enlarged fragmentary view of FIG. 2 illustrating a vertical cross-section of the friction generating mechanism.

As seen in FIG. 1, an intermediate rotating member 10 is a member provided in such a way as to be able to rotate relatively between the input rotational member 2 and the output rotational member 3. Further, as seen in FIG. 4, the intermediate rotating member 10 engages with the output rotational member 3 in the rotational direction and forms a second friction generating unit 71 (to be described later) between it and the input rotational member 2. Referring again to FIG. 1, the intermediate rotating member 10 is made of a bush 51 and a plate 52. The bush 51 is an annular member placed between the inner periphery of the clutch plate 12 and the flange 8 and is typically made of a plastic material.

Figure 12:
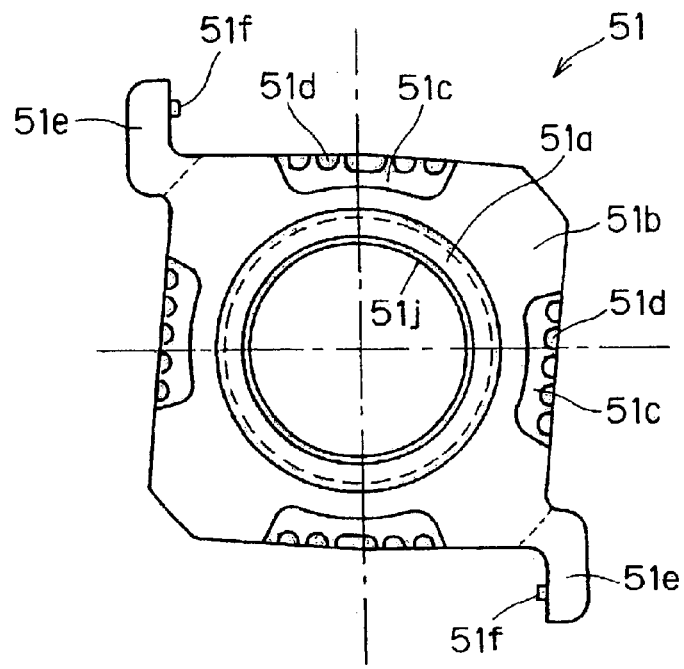
FIG. 12 is an elevational view of a bush that is a part of an intermediate rotating member of the damper disk assembly.
Figure 13:
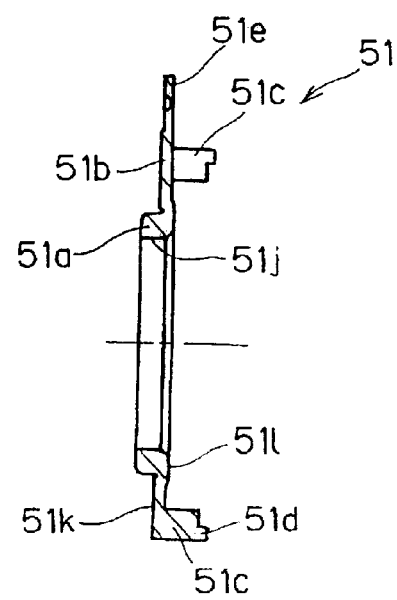
FIG. 13 is a cross-sectional view of the bush of FIG. 12.

As shown in FIG. 12 and FIG. 13, the bush 51 is a circular plate-like member, on which a center hole 51j is formed, and primarily is made of a tube-like boss 51a and a rectangular or an alternative parallelogram-shaped flange 51b. Protrusions 51c are formed in the middle of each side (outer edge) of the flange 51b in the rotational direction. Each protrusion 51c has a thin wall shape extending in the rotational direction and its distal end has a plurality of semicircular protrusions 51d formed in the rotating direction. As seen in FIG. 4, each protrusion 51c extends into the radial direction concave part 64a of the first window opening 43 and the radial direction concave part 68a of the second window opening 44. Referring to FIGS. 12 and 13, the protrusions 51e are formed on two places positioned diagonally on the flange 51b. The protrusions 51e are provided close to the rotational direction supporting parts 65 on the rotational direction R1 side of the first window openings 43, more specifically on the rotational direction R1 side of the inner portion of the rotational support part 65 in the radial direction. A small protrusion 51f is formed on the rotational direction R2 side of each protrusion 51e.

Referring to FIGS. 4 and 13, a surface 51k of the bush 51 on the engine side in the axial direction abuts on an inner periphery side of the clutch plate 12. A surface 51l of the bush 51 on the transmission side in the axial direction and in the innermost periphery abuts the inner surface 8a of the flange 8 on its engine side in the axial direction. The boss 51a of the bush 51 is sandwiched between the inner periphery of the clutch plate 12 and the outer periphery 7a of the boss 7, and positions the plate 12 in the radial direction relative to the boss 7.

Figure 10:
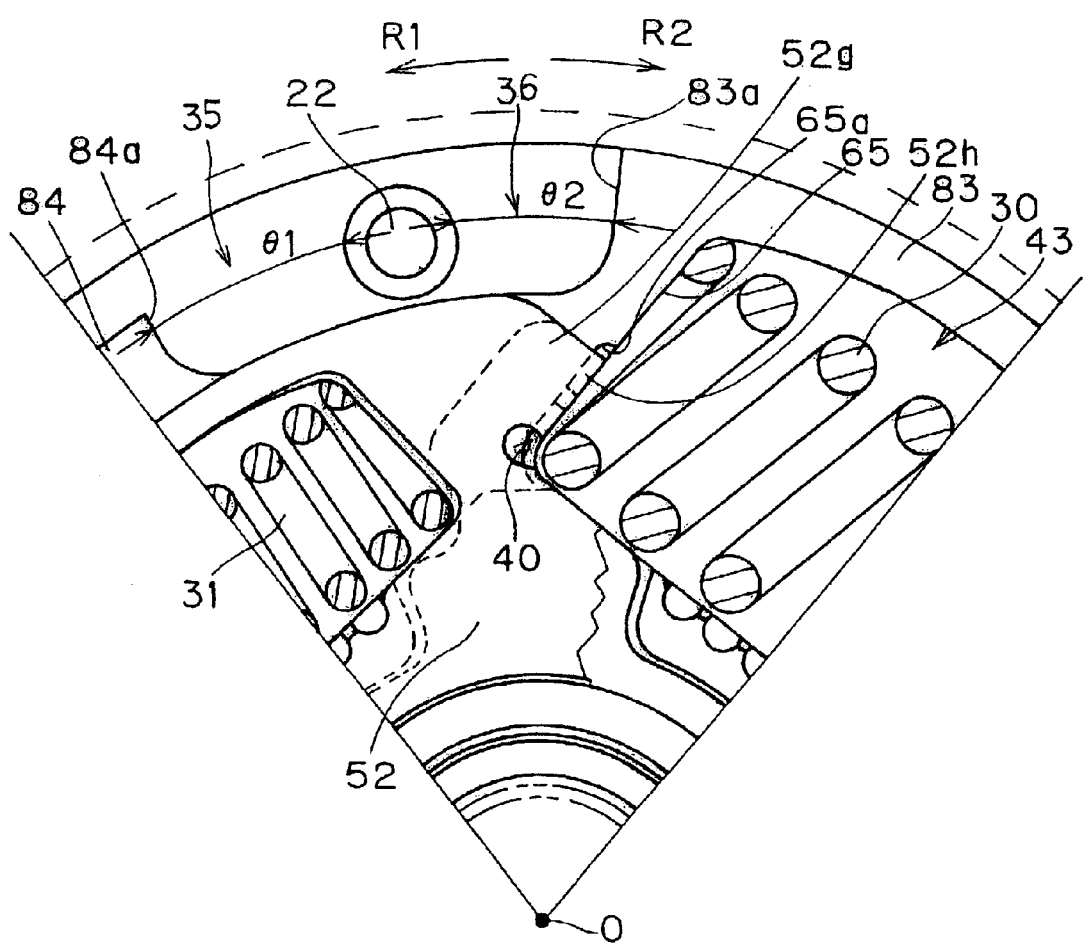
FIG. 10 is an alternate enlarged fragmentary view of FIG. 3 (the first embodiment)
Figure 14:
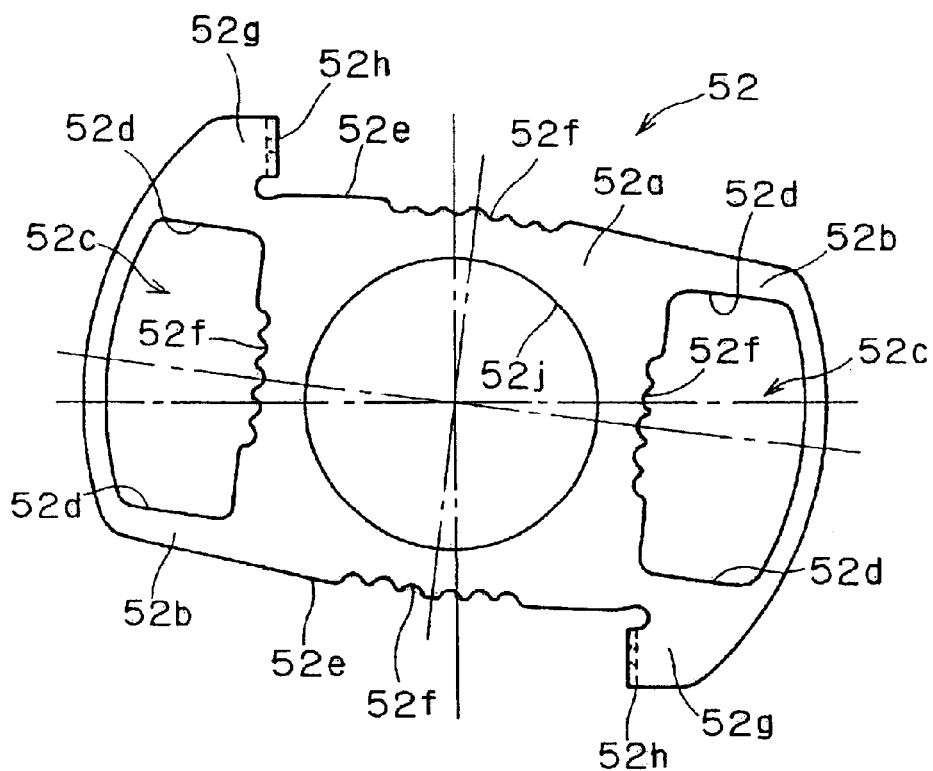
FIG. 14 is an elevational view of a plate that is a part of the intermediate rotating member.
Figure 15:
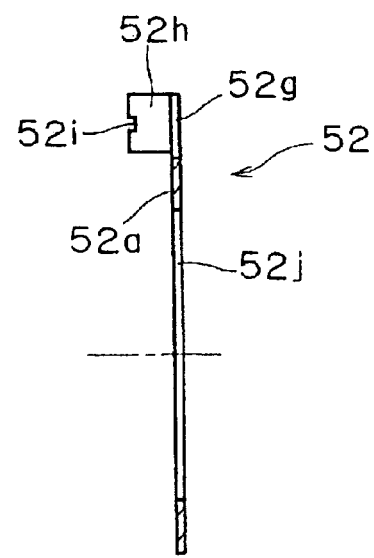
FIG. 15 is a cross-sectional view of the plate of FIG. 14.

As seen in FIG. 1, the plate 52 is a member placed between the flange 8 and the retaining plate 13 and is typically made of sheet metal. As shown in FIG. 14 and FIG. 15, the plate 52 has a center hole 52j and extends on both sides in the radial direction. The plate 52 is made of a central part 52a and a part 52b that extends on both sides in the radial direction. The plate 52 has a straight side 52e that extends along the part 52b. The part 52b of the plate 52 that extends on both sides in the radial direction has a pair of the window openings 52c formed in correspondence with the second window openings 44. The window openings 52c have similar shapes as the second window openings 44. Further, the rotating direction support parts 52d of the window openings 52c abut or are close to both ends of the second elastic members 31 in the rotational direction. A plurality of semi-circle shaped concave parts 52f are formed in the rotational direction on the straight side 52e and on the inner periphery side support part of each window opening 52c. The concave parts 52f engage with the protruding parts 51d of the bush 51, so that both members 51 and 52 rotate together. A protruding part 52g is formed on the outer edge of the plate 52 in the rotating direction R2 side of each window opening 52c. A bent tongue 52h is formed to extend axially from the edge of each protruding part 52g on the rotational direction R2 side. As seen in FIG. 10, the bent tongue 52h is stored inside the concave part 65a of the first window opening 43 and supports the end of the first elastic member 30 on the rotational direction R1 side together with the rotational direction supporting part 65. Consequently, the tongue 52h is sandwiched between the rotational direction supporting part 65 of the first window opening 43 on the rotational direction R1 side and the edge of the second elastic member 31 on the rotational direction R1 side, so that it can move away from the flange 8 in the rotational direction R2 side but cannot move toward the rotational direction R1 side. As seen in FIGS. 10 and 15, a notch 52i is formed on the tip of the bent tongue 52h and engages with the protruding part 51 of the bush 51.

As can be seen from the above, the bush 51 and the plate 52 not only abut each other in the axial direction, but also engage with each other in the rotational direction to constitute a single member (the intermediate rotating member 10) that rotates as a unit. Referring to FIG. 2, since the axial distance between the bush 51 and the plate 52 is larger than the axial thickness of the flange 8, both sides of the flange 8 in the axial direction are placed axially inside the members 51 and 52. Thus, the intermediate rotating member 10 is primarily made of two members, i.e., the bush 51 and the plate 52. Further, the bush 51 has the protrusion 51c that engages with the plate 52. Hence, it is possible to omit the auxiliary pin in the prior art design, thus, reducing the number of parts and the total cost.

Figure 9:
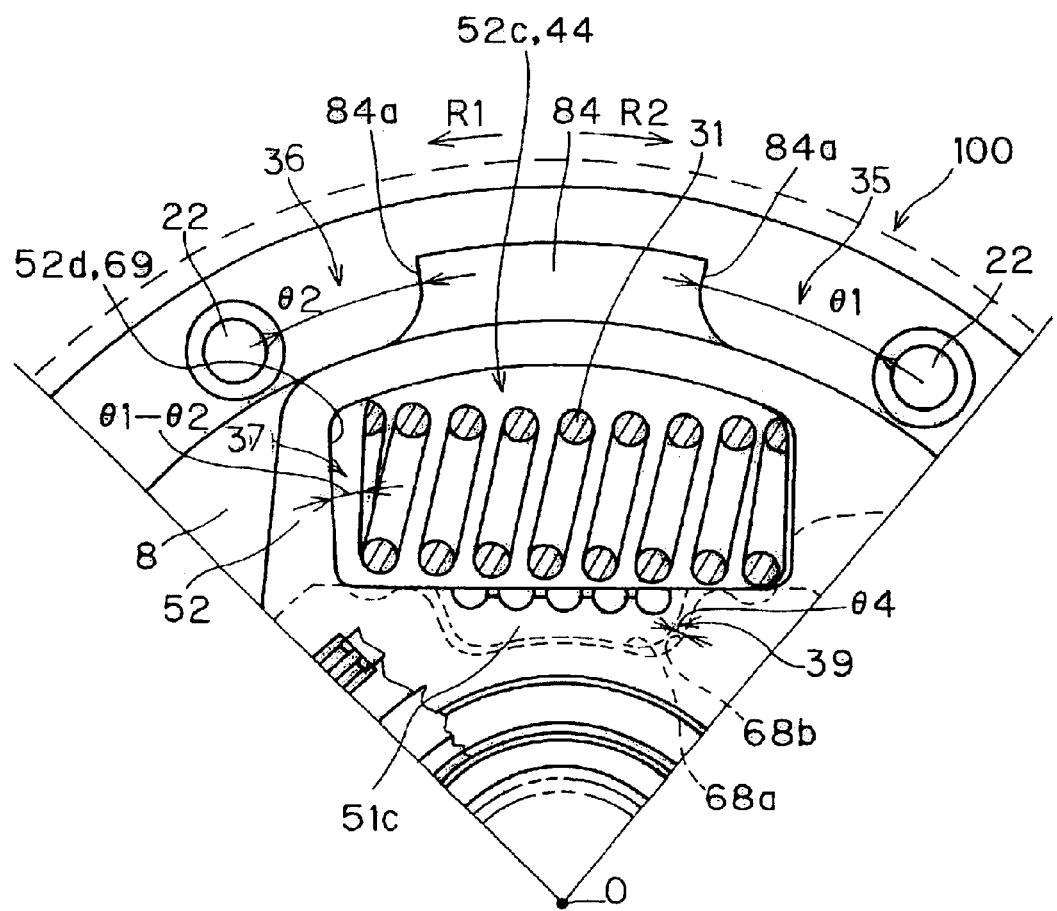
FIG. 9 is an enlarged fragmentary view of FIG. 3 (the first embodiment)

As shown in FIG. 3, the protruding parts 51c of the bush 51 extend axially through the concave parts 64a and 68a of the window openings 43 and 44 in the radial direction. A fifth rotational direction gap 39 is formed as shown in FIG. 9 between the protruding part 51c and the edges 64b and 68b of radial direction the concave parts 64a and 68a on the rotational direction R2 side.

The relation between the intermediate rotating member 10 and flange 8 can be summarized based on the above description in that the intermediate rotating member 10 cannot rotate relative to the flange 8 in the rotational direction R1 as the bent tongue 52h abuts the rotational direction the supporting part 65 of the first window opening 43 on the rotation direction R1 side. However, the intermediate rotating member 10 can rotate relative to the flange 8 in the rotational direction R2 until the protruding parts 51c abut against the edges 64b and 68b of radial direction the concave parts 64a and 68a on the rotating direction R2 side. In other words, as shown in FIG. 10, the tongues 52h can form sixth rotational gaps 40 by being separated in the rotational direction R2 from the concave parts 65a by a certain angle. Thus, the intermediate rotating member 10 is capable of rotating relative to the flange 8 by torsional angles corresponding to the rotational direction gaps 39 and 40. It is designed in such a way as can be seen from the above that the intermediate rotating member 10 rotates together with the output rotating member 3 on the positive side of the torsional characteristics, but rotates relatively within certain angle ranges on the negative side.

(6) Friction Generating Mechanism

As seen in FIG. 1, the clutch disk assembly 1 further includes a friction generating mechanism 79 provided for functioning in parallel with the elastic connection mechanism 4. As seen in FIG. 4, the friction generating mechanism 79 has a first friction generating unit 70 for generating low hysteresis torque and a second friction generating unit 71 for generating high hysteresis torque.

The first friction generating unit 70 is a mechanism for generating hysteresis torque in the entire region where the elastic connection mechanism 4 is operating, i.e., on both the positive and negative sides of the torsional characteristics. The first friction generating unit 70 is equipped with a first bush 72 and a first cone spring 73. The first bush 72 and the first cone spring 73 are provided between the inner periphery part 8a of the flange 8 and the inner periphery part of the retaining plate 13. The first bush 72 is a washer-like member and has a friction surface that abuts the inner periphery 8a of the flange 8 on its transmission side in the axial direction in such a way as to be able to slide. The first cone spring 73 is placed axially between the first bush 72 and the retaining plate 13 and is axially compressed.

Due to the structure of the first friction generating unit 70 as described above, the first bush 72 rotates together with the clutch plate 12 and the retaining plate 13 and is pressed against the flange 8 in the axial direction due to the elastic force of the first cone spring 73 and is capable of sliding in the rotational direction.

The second friction generating unit 71 is equipped with a second bush 76 and a second cone spring 77. The second bush 76 and the second cone spring 77 are placed between the center part 52a of the plate 52 and the inner periphery of the retaining plate 13 in the axial direction, in other words, on the radial outer side of the first bush 72 and the first cone spring 73. The second bush 76 has a friction surface that abuts the center part 52a of the plate 52 on its transmission side in the axial direction. The second bush 76 has a protrusion 76a that extends in the axial direction from its annular main body and penetrates into an opening formed in the retaining plate 13. Due to this engagement, the second bush 76 is movable in the axial direction, but is not rotatable relative to the retaining plate 13. The second cone spring 77 is placed axially between the second bush 76 and the inner periphery of the retaining plate 13 and is axially compressed between them. A concave part is formed on the inner periphery of the second bush 76 for the protrusion extending from the first bush 72 to engage therewith in the rotational direction, and this engagement makes it possible for the first bush 72 to rotate together with the second bush 76 and the retaining plate 13.

Due to the structure of the second friction generating unit 71 as described above, the second bush 76 that rotates together with the clutch plate 12 and the retaining plate 13 is pressed against the intermediate rotating member 10 in the axial direction due to the elastic force of the second cone spring 77 and is capable of sliding in the rotational direction. The hysteresis torque generated by the second friction generating unit 71 is substantially larger (10–20 times larger) than that generated in the first friction generating unit 70.

(7) Rotating Direction Gap

The relationships among the various torsional angles of the rotating direction gaps 35 through 40 will be described below. It should be noted that specific numerical values shown below are only examples used for the sake of explanation, and the invention is not necessarily limited to those values.

As seen in FIG. 3, the first rotational direction gap 35 represents the total torsional angle on the positive side of the torsional characteristics of the damper disk assembly 1. The specific numerical value of $\theta 1$ is 16.5 degrees, but, as stated, the invention is not limited by the numerical value. The second rotational gap 36 represents the total torsional angle on the negative side of the torsional characteristics of the damper disk assembly 1 and its size is represented by $\theta 2$. The specific numerical value of $\theta 2$ is 13.0 degrees and is smaller than $\theta 1$. Therefore, the sum of $\theta 1$ and $\theta 2$ represents the total torsional angle of the clutch disk assembly 1.

The third rotational direction gap 37 is the torsional angle on the positive side of the torsional characteristics prior to the compression of the second elastic members 31 (the region where only the first elastic members 30 are compressed). A value of the torsional angle of the region where the second elastic member 31 is compressed is $\theta 2$, and the value of the torsional angle of the third rotational direction gap 37 is $\theta 1-\theta 2$. In this embodiment, $\theta 1-\theta 2$ is preferably 3.5 degrees. Consequently, the positive side of the torsional characteristics includes the first region (0–3.5 degrees) where only the first elastic members 30 are compressed and the second region (3.5–16.6 degrees) which is a region larger than the first region and in which both the first elastic members 30 and the second elastic members 31 are compressed in parallel, thus achieving a multiple stage feature of the positive side of the torsional characteristics.

The fourth rotational direction gap 38 is the torsional angle on the negative side of its torsional characteristics prior to the compression of the first elastic members 30 (the range where only second elastic members 31 are compressed). The value of the torsional angle of the region where the first elastic member 30 is compressed is $\theta 3$, and the value of the torsional angle of the fourth rotational direction gap 38 is $\theta 2-\theta 3$. Since $\theta 3$ is 2 degrees, $\theta 2-\theta 3$ is 11 degrees. Consequently, the negative side of the torsional characteristics includes the third region (0–11 degrees) where only the second elastic members 31 are compressed and the fourth region (11–13 degrees) which is a region larger than the third region and in which both the first elastic members 30 and the second elastic members 31 are compressed in parallel, thus achieving the multiple stage feature for the negative side of the torsional characteristics.

Referring to FIGS. 9 and 10, the fifth rotation direction gap 39 and the sixth rotation direction gap 40 are gaps for preventing the second friction generating unit 71 from generating friction resistance for a certain range of torsional vibrations on the negative side of the torsional characteristics. The torsional angle for the fifth rotation direction gap 39 and the sixth rotation direction gap 40 is shown as θ4. In this embodiment, θ4 is preferably 2 degrees.

(8) Torsional Characteristics

Figure 16:
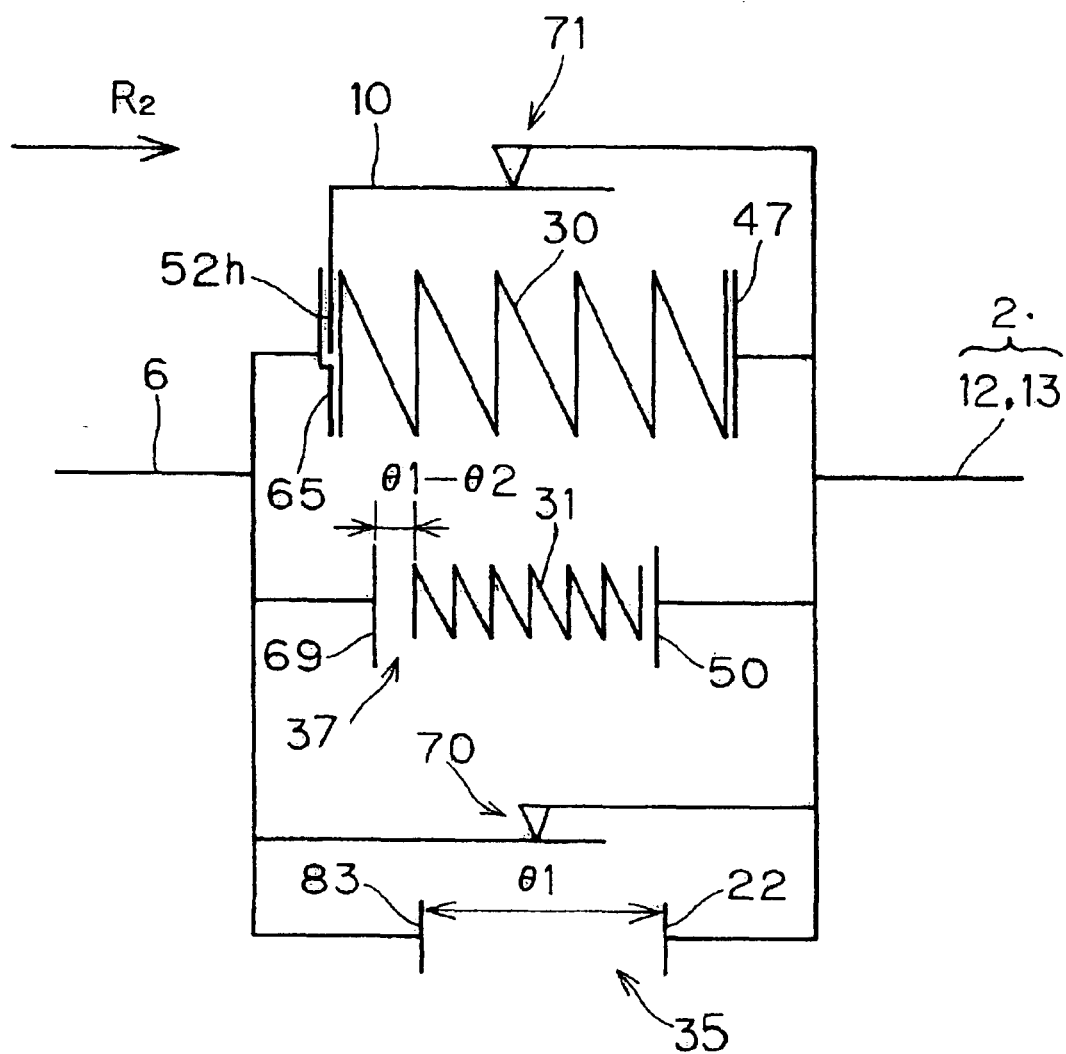
FIG. 16 is a view of a schematic drawing illustrating a damper mechanism of the clutch disk assembly.
Figure 17:
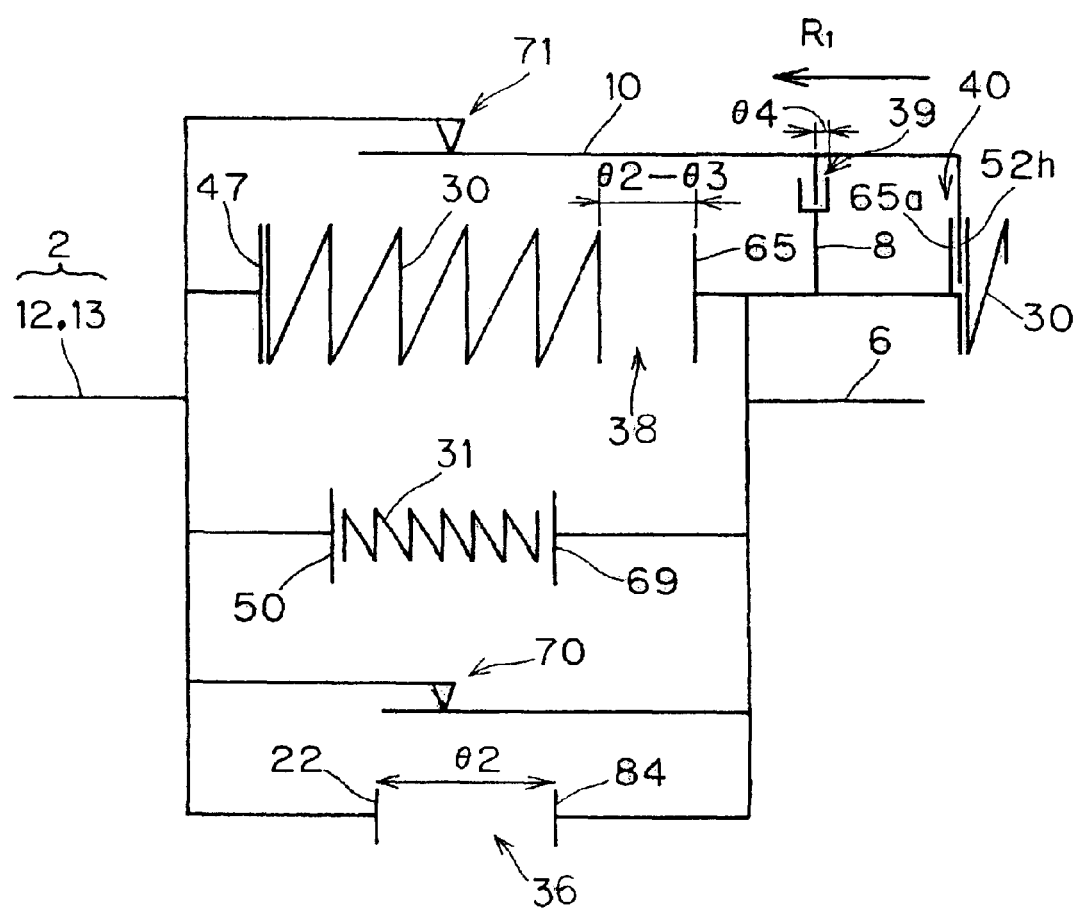
FIG. 17 is an alternate view of a schematic drawing of the damper mechanism of the clutch disk assembly.
Figure 18:
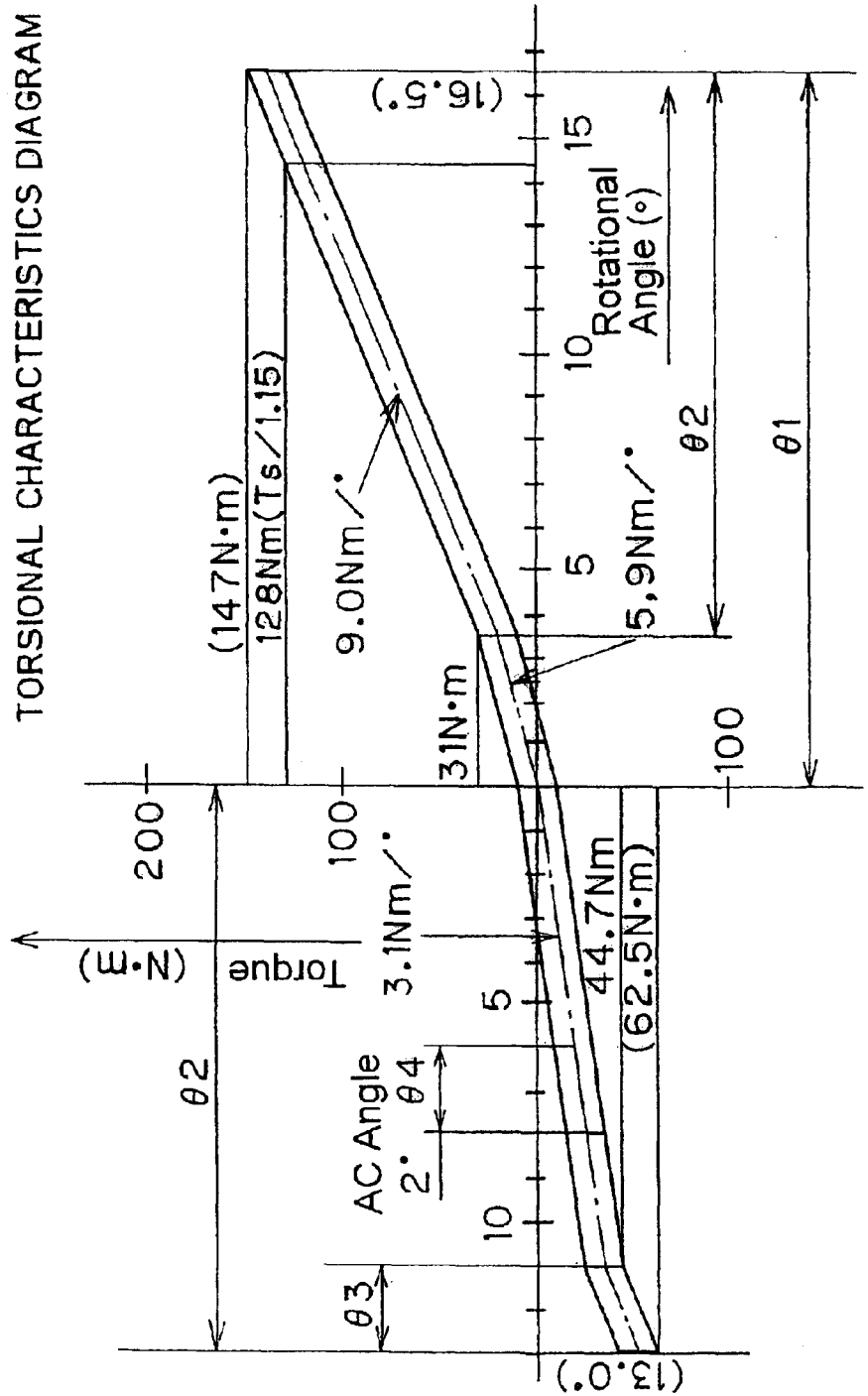
FIG. 18 is a view of a torque characteristic diagram of the clutch disk assembly.

Next, the torsional characteristics of the clutch disk assembly 1 is described using schematic drawings of the damper mechanism shown in FIG. 16 and FIG. 17 as well as a torsional characteristic diagram shown in FIG. 18. The specific numerical values shown in FIG. 18 are disclosed as those of an example of a preferred embodiment of the present invention and should not be construed to limit the invention.

First, an operation on the positive side region of the torsional characteristics will be described, in which, starting from a neutral position shown in FIG. 16, where the input rotational member 2 is fixed, the hub 6 is twisted in the rotational direction R2 (as a result, the input rotational member 2 is twisted relative to the output rotational member 3 in the rotational direction R1). In a region where the torsional angle is small, the two first elastic members 30 are compressed. When the torsional angle becomes larger than θ1–θ2, the rotational direction supporting parts 69 of the second window openings 44 on the rotational direction R1 side abut the side edge of the second elastic members 31 in the rotational direction R1. From thereon, the two first elastic members 30 are compressed in parallel with the two second elastic members 31, thus providing a high rigidity characteristic. Also, the first friction generating unit 70 and the second friction generating unit 71 operate, thus providing a high hysteresis characteristic. In the second friction generating unit 71, the intermediate rotating member 10 rotates together with the flange 8 in the rotational direction R2 as the bent tongues 52h are pressed against the rotational support parts 65 of the first window openings 43 on the R1 side, and slides relative to the second bush 76.

On the positive side of the torsional characteristics, the bent tongues 52h of the intermediate rotational member 10 are constantly pressed against the rotating direction support part 65 of the first window opening 43 on the rotation direction R1 side by means of the first elastic members 30 when minute torsional vibrations enter the clutch disk assembly 1. Therefore, the intermediate rotating member 10 cannot rotate relative to the flange 8, and the elastic forces of the elastic members 30 and 31 are always acting on the second friction generating unit 71 via the intermediate rotating member 10 even when minute vibrations are being entered. In other words, when the input rotating member 2 and the output rotational member 3 are rotating relative to each other, the second friction generating unit 71 is always acting and generating high hysteresis torque on the positive side of the torsional characteristics.

Next, an operation on the negative side region of the torsional characteristics will be described, in which, starting from a neutral position shown in FIG. 17, where the input rotational member 2 is fixed, the hub 6 is twisted in the rotational direction R1 (as a result, the input rotational member 2 gets twisted relative to the output rotational member 3 in the rotational direction R2).

In a region where the torsional angle is small, only the two second elastic members 31 are compressed and a lower rigidity is achieved in comparison with the positive side. Also, the first friction generating unit 70 and the second friction generating unit 71 operate, thus providing a high hysteresis characteristic. At this time in the second friction generating unit 71, the intermediate rotating member 10 rotates together with the flange 8 in the rotational direction R1 and slides relative to the second bush 76 as the protruding part 51c of the bush 51 is pressed to rotational direction R2 side edge of the radial direction concave parts 64a and/or 68a. In other words, the bent tongues 52h are separated from the concave parts 65a in the rotational direction R2 by an angle of θ4.

When the torsional angle becomes θ2–θ3, the rotational direction supporting parts 65 of the first window openings 43 on the rotational direction R2 side abut with the side edge of the first elastic members 30 in the rotational direction R2. From thereon, the two first elastic members 30 are compressed in parallel with the two second elastic members 31. As a result, high rigidity and high hysteresis torque torsional characteristics are achieved.

As can be seen from the above, the second elastic members 31 are compressed only within the range of torsional angle θ2 (which is smaller than the positive side total angle θ1) in the positive side of the torsional characteristics, the angle compressed on the positive side is equal to the angle compressed on the negative side (negative side total angle). As an alternative embodiment, the angle through which the second elastic members 31 are compressed on the positive side can be selected to be smaller than the angle compressed on the negative side (negative side total angle). Such an alternative of choosing the angle of the second elastic members 31 to be no greater than the angle of compression on the negative side (negative side total angle), the second elastic members 31 can be of a relatively low rigidity and a low torque capacity. As a result, the shape of the second elastic member 31 can be made smaller than that of the first elastic member 30 as mentioned before, thus making it easier to locate the second elastic member 31 radially inside of the operating range of the stop pin 22.

Next, with reference to a torsional diagram shown in FIG. 18, the torsional characteristics will be described for various torsional vibrations entering the clutch disk assembly 1. When a torsional vibration with large amplitudes such as the forward/backward vibration of a vehicle occurs, the torsional characteristics go through repetitive variations over both the positive and negative sides. In this case, the forward/backward vibrations will be attenuated quickly through the hysteresis torque that develop on both the positive and negative sides.

Next, let us assume minute torsional vibrations are input into the clutch disk assembly 1 resulting from the engine combustion fluctuations during a deceleration period accompanying engine braking. In this case, the intermediate rotating member 10 rotates relative to the flange 8 in the fifth rotational direction gap 39, and does not slide relative to the second bush 76 and the clutch plate 12 in the second friction generating unit 71. As a result, a high hysteresis torque will not be generated for minute torsional vibrations. In other words, in the torsional characteristic diagram, the second elastic member 31 operates within the gap angle θ4, but no slippage occurs in the second friction generating unit 71. In other words, the hysteresis torque (hysteresis torque by means of the first friction generating unit 70) is much smaller than the hysteresis torque on the negative side, and is obtained in the range of the torsional angle θ4. The hysteresis torque within θ4 should preferably be in the range of ¹⁄₁₀ of the hysteresis torques of the total range. As can be seen from the above, the vibration and noise level during a deceleration period accompanying engine braking can be substantially reduced as a rotational direction gap is provided for preventing the second friction generating unit 71 from operating within a specified angle on the negative side of the torsional characteristics. Since a rotational direction gap for preventing the second friction generating unit 71 from operating within a specified angle is not provided on the positive side of the torsional characteristics, the noise and vibration performance in the vicinity of resonance rpm does not deteriorate, for example, in a FF car, in which it is rather difficult to eliminate resonance peaks completely from the practical rpm range. Since rotational gaps are provided for preventing the friction mechanism from operating within a specified angle only on one of the positive and negative sides of the torsional characteristics, the noise and vibration performances in both acceleration and deceleration improve.

As described above, the damper mechanism according to this invention not only uses different torsional rigidities on the positive and negative sides of the torsional characteristics, but also has a structure that prevents high hysteresis torque against minute torsional vibrations on one side of the torsional characteristics, preferable torsional characteristics can be achieved as a whole. The damper mechanism according to the present invention provides a friction suppressing mechanism that prevents high hysteresis torque from being generated for minute torsional vibrations only on one side of the torsional characteristics by means of a simple structure using the intermediate rotating member 10. More specifically, the intermediate rotating member 10 is arranged such that relative rotation with the flange 8 within the ranges of the fifth rotating direction gaps 39 and the sixth rotating direction gaps 40 at two separate locations, i.e., the protrusions 51c of the bush 51 and the bent tongues 52h. Thus, the intermediate rotating member 10 not only functions as a friction member that frictionally slides against the input rotating member 2, but also does not generate friction within a specified torsional angle. Moreover, since the bent tongues 52h of the intermediate member 10 are sandwiched between the rotating direction support parts 65 of the first window openings 43 of the flange 8 on the rotational direction R1 side and the side edge of the first elastic members 30 on the rotational direction R1 side as shown in FIG. 10, it is always pressed against the rotating direction support parts 65 of the first window openings 43 on the positive side of the torsional characteristics by means of the first elastic members 30 and cannot move the flange 8 towards the rotational direction R2 side. In other words, the intermediate rotating member 10 rotates together with the flange 8 even when minute torsional vibrations are entered on the positive side of the torsional characteristics. In the meanwhile, on the negative side of the torsional characteristics, the side edges of the first elastic members 30 on the rotational direction R1 side are separated from the rotational direction supporting parts 65 of the first window openings 43 in the rotational direction R2 side, and the bent tongues 52h can move away from the concave parts 65a in the rotational direction R2. In other words, if minute torsional vibrations are input on the negative side of the torsional characteristics, the intermediate rotating member 10 is capable of rotating relative to the flange 8 within the torsional angle θ4.

Second Embodiment

A second preferred embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

2. Second Embodiment (1) Overall Constitution

Figure 19:
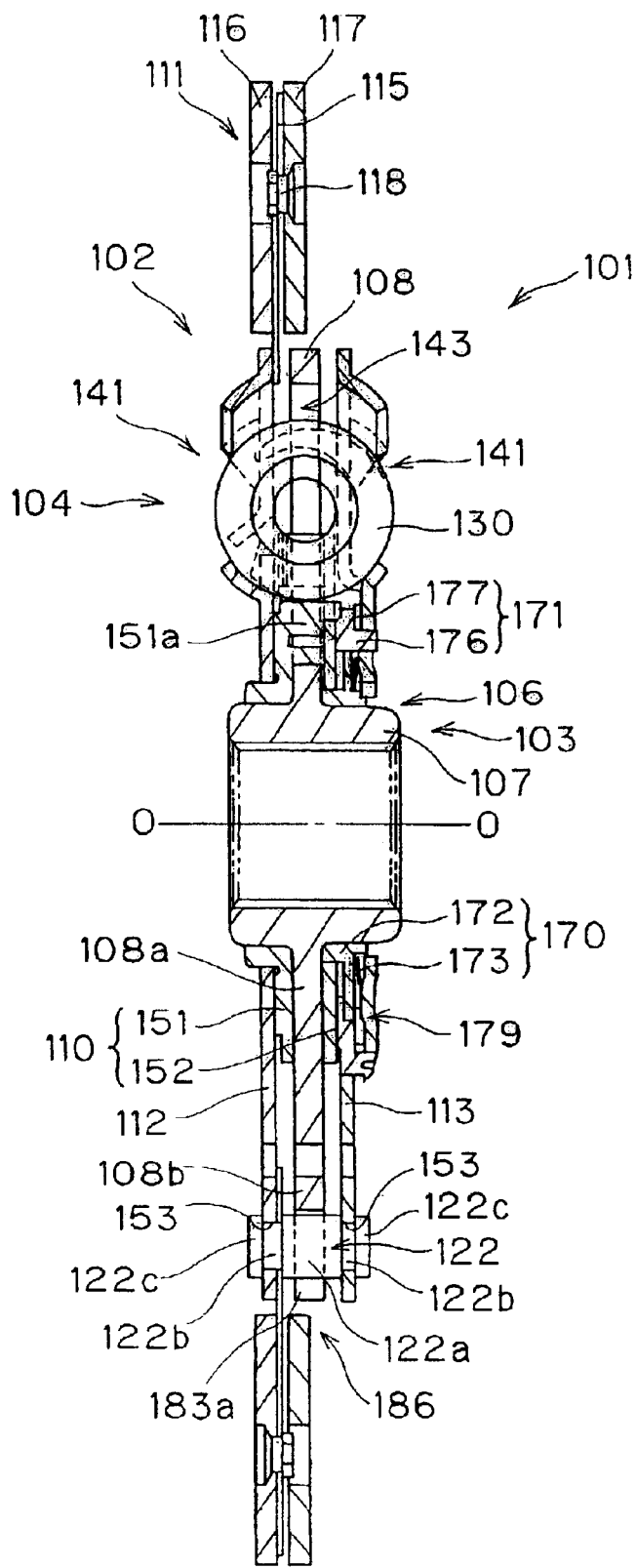
FIG. 19 is a vertical cross-sectional view of a clutch disk assembly in accordance with a second preferred embodiment of the present invention, taken from angle IXX-O-IXX in FIG. 21.
Figure 20:
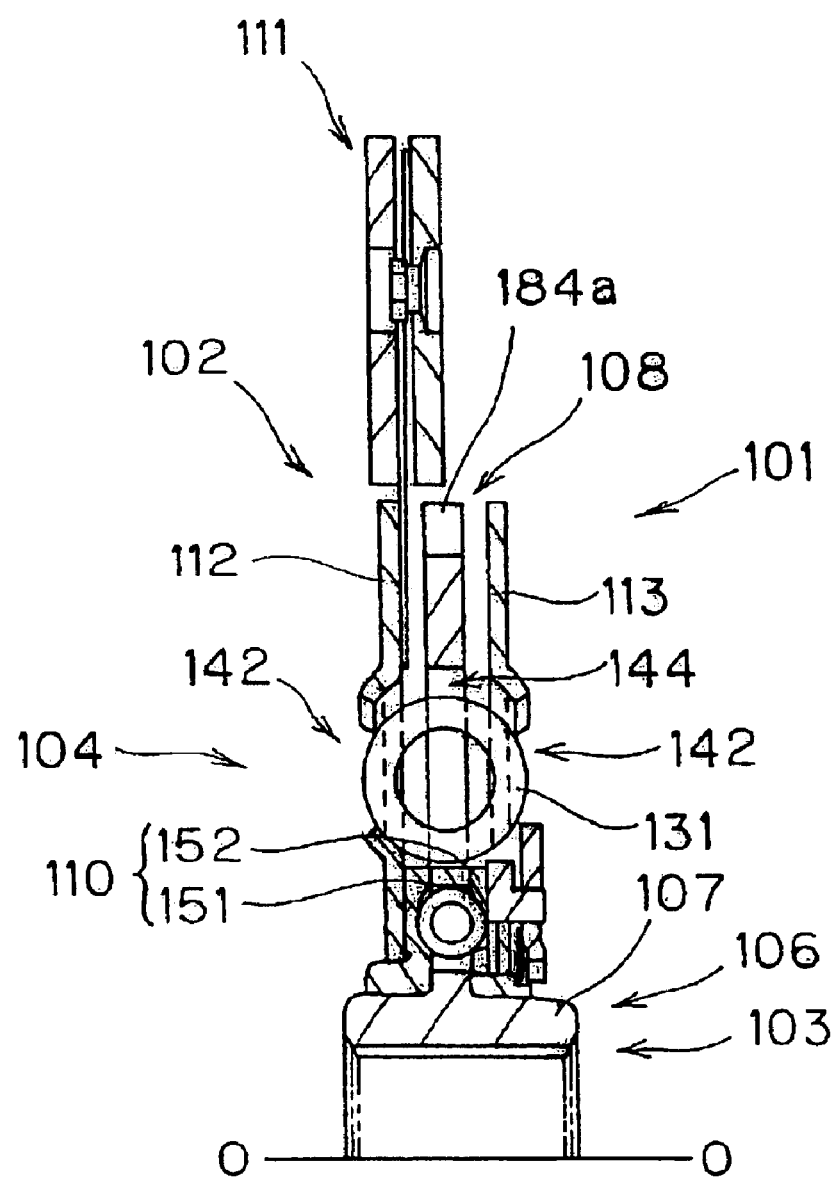
FIG. 20 is a vertical cross-sectional view of the clutch disk assembly in accordance with the second preferred embodiment of the present invention, taken from line segment XX-O in FIG. 21.
Figure 21:
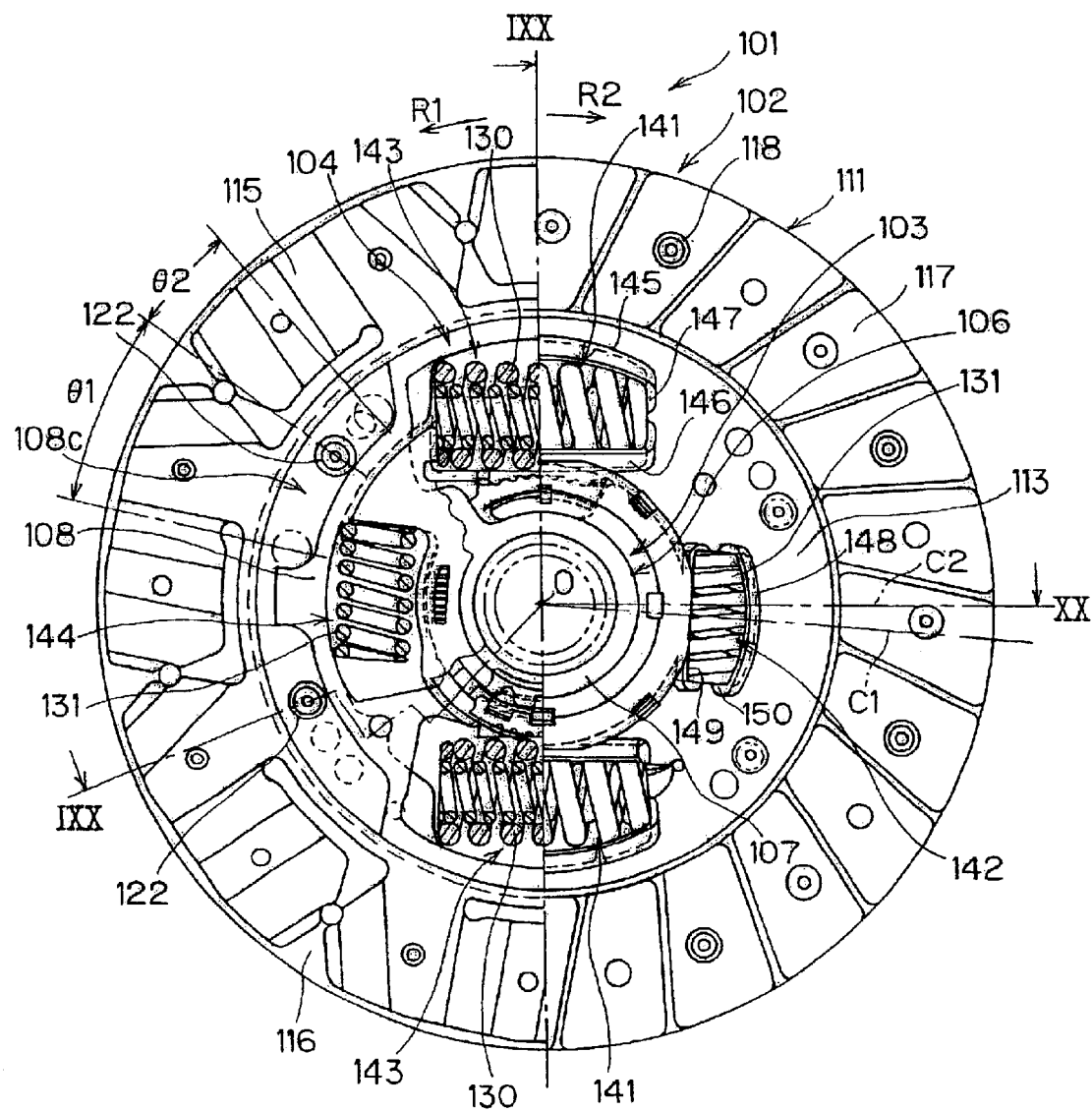
FIG. 21 is an elevational view of the clutch disk assembly of FIG. 19 with sections removed for illustrative purposes.

FIG. 19 and FIG. 20 are cross-sectional views of a clutch disk assembly 101 in accordance with a second preferred embodiment of the present invention, and FIG. 21 is an elevational view of the same. The clutch disk assembly 101 is a power transmitting device used in a clutch device of a vehicle (especially a FF car), and has a clutch function and a damper function. The clutch function is provided to transmit and interrupt power by means of connecting and disconnecting with a flywheel (not shown). The damper function is provided to absorb and attenuate torque fluctuations supplied from the flywheel side by means of springs, etc. In FIG. 19 and FIG. 20, O-O represents the rotating axis of the clutch disk assembly 101. The engine and the flywheel (not shown) are located on the left side of FIG. 19, and the transmission (not shown) is located on the right side of FIG. 19. Arrow R1 in FIG. 21 represents the drive side (positive rotational direction) of the clutch disk assembly 101, while arrow R2 represents its opposite side (negative rotational side). Unless otherwise indicated, the "rotational (circumferential) direction," the "axial direction," and the "radial direction" mean each direction the clutch disk assembly 101 as a rotating member in the following explanation.

As seen in FIG. 19, the clutch disk assembly 101 primarily is made of an input rotational member 102, an output rotational member 103, and an elastic connection mechanism 104 located between the two rotational members 102 and 103. Also, these members constitute a damper mechanism that attenuate torsional vibrations while transmitting torque as well.

(2) Input Rotational Member

The input rotational member 102 is a member that receives torque from the flywheel (not shown). The input rotational member 102 primarily is made of a clutch disk 111, a clutch plate 112, and a retaining plate 113. The clutch disk 111 connects with the flywheel (not shown) when it is pressed against it. The clutch disk 111 includes cushioning plates 115 and a pair of friction facings 116 and 117 that are affixed on both sides thereof in the axial direction by means of rivets 118.

The clutch plate 112 and the retaining plate 113 are preferably both metallic circular and annular members and are arranged to maintain a certain distance between them in the axial direction. The clutch plate 112 is placed on the engine side of the assembly, and the retaining plate 113 is placed on the transmission side of the assembly. Stop pins 122 are provided on the outer periphery of the retaining plate 113 at multiple, preferably four, places, which are specifically spaced in the circumferential direction. The stop pins 122 are cylindrical members extending in the axial direction. Each stop pin 122 is made of a barrel part 122a, neck parts 122b, and heads 122c. The barrel part 122a is interposed between the plates 112 and 113 in the axial direction. The neck parts 122b extend from both ends of the barrel part 122a and are arranged in holes 153 of the plates 112 and 113. Further, the heads 122c abut with the outer axial sides of the plates 112 and 113 in the axial direction. One side of the heads 122c is formed by caulking. The stop pins 122 ensure that the clutch plate 112 and the retaining plate 113 rotate together and determine the axial distance between the plates 112 and 113. The stop pins 122 affix the inner periphery of the cushioning plate 115 to the outer periphery of the clutch plate 112. The pin members of this invention are not limited in the structure or the shape of stop pins 122 shown here.

Figure 22:
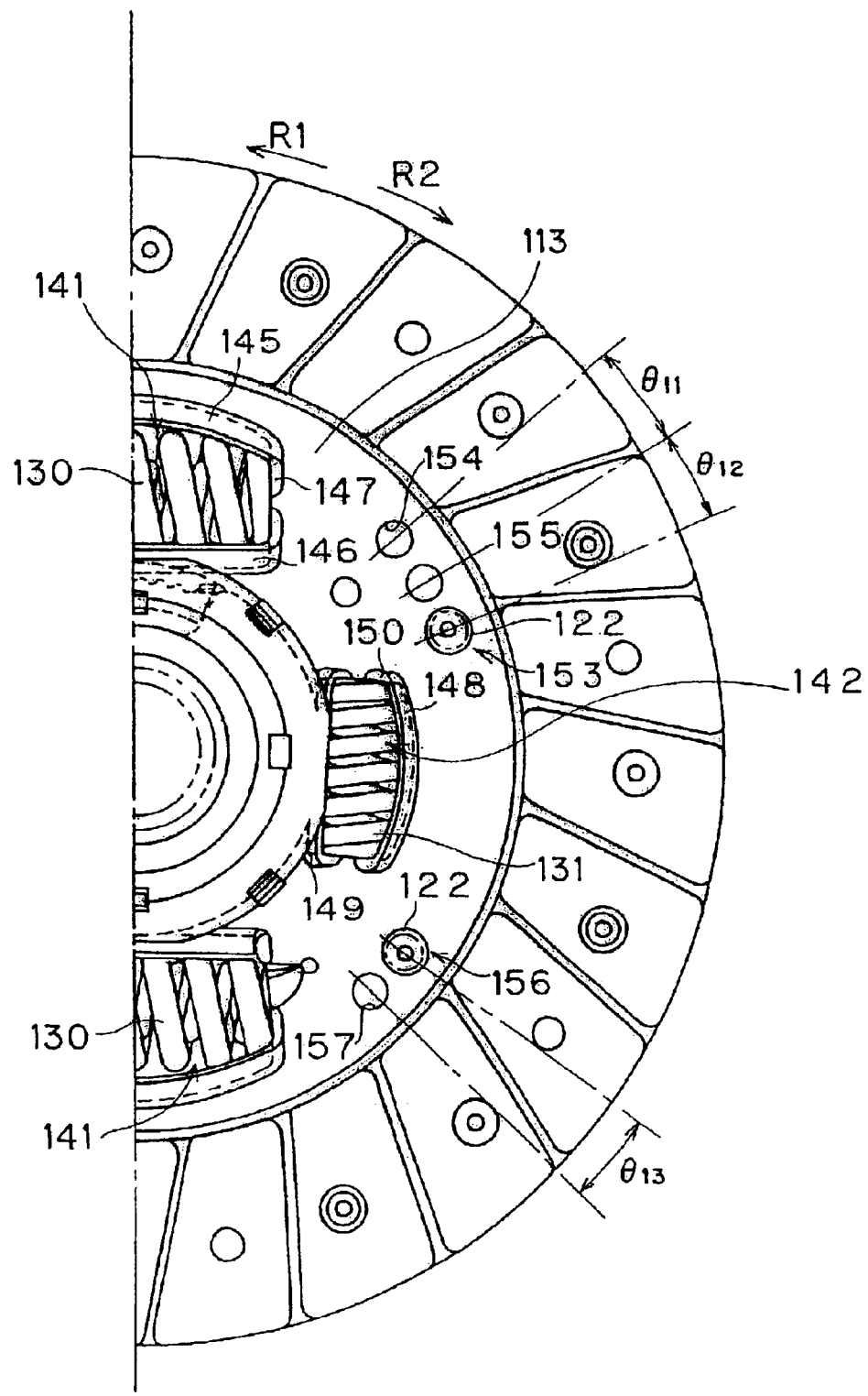
FIG. 22 is an enlarged fragmentary view of FIG. 21 illustrating a partial elevational view of the clutch disk assembly.

Each of the clutch plate 112 and the retaining plate 113 have a center hole. A boss 107, to be described later, is placed inside the center holes. As seen in FIG. 21, the clutch plate 112 and the retaining plate 113 are each provided with multiple windows 141 and 142 formed in the circumferential direction. The windows 141 and 142 have an identical or substantially identical shape and are formed at multiple, preferably four, places, which are equally spaced in the circumferential direction. Each of the windows 141 and 142 has a shape extending substantially in the circumferential direction. The pair of windows 141 located apart from each other in the vertical direction in FIG. 21 and FIG. 22 is called first windows 141, and the pair of windows 142 located apart from each other in the horizontal direction in FIG. 21 and FIG. 22 is called second windows 142. The windows 141 and 142 have holes penetrating in the axial direction and a support part formed along the hole periphery.

The supporting parts of the first windows 141 are made of an outer periphery supporting part 145, an inner periphery supporting part 146, and a rotational direction supporting part 147. In an elevational view, the outer periphery supporting part 145 is curved substantially in the circumferential direction, while the inner periphery supporting part 146 extends substantially straight. The rotational direction supporting part 147 extends substantially straight in the radial direction, and is parallel or substantially parallel to a straight line passing through the center of the windows 141 and the center O of the clutch disk assembly 101. The outer periphery support part 145 and the inner periphery support part 146 are both formed by raising other parts of the plate 112 or 113 in the axial direction.

The supporting parts of the second windows 142 are made of an outer periphery supporting part 148, an inner periphery supporting part 149, and a rotational direction supporting part 150. In an elevational view, the outer periphery supporting part 148 is curved substantially in the circumferential direction, while the inner periphery supporting part 149 extends substantially straight. If a straight line connecting the centers of the first windows 141 in the rotational direction is called C1 and a straight line perpendicular to it is called C2 as shown in FIG. 21, straight line C3 connecting the centers of the second windows 142 in the rotational direction is offset by a certain angle relative to straight line C2 by a certain angle on the rotational direction R2 side. In other words, each second window 142 is closer to the first window 141 on the rotational direction R2 side than toward the first window 141 on the rotational direction R1 side. The second windows 142 are shorter than the first windows 141 both in terms of the rotational direction length and the radial direction width. Moreover, the inner radius of the second windows 142 is substantially equal to the inner radius of the first windows 141, but the outer diameter of the second windows 142 is smaller than the outer diameter of the first windows 141.

The positions of the stop pins 122 on the plates 112 and 113 will be described below. The stop pins 122 are provided on the outer peripheries of the plates 112 and 113 between the windows 141 and 142 in the rotational direction. More specifically, the stop pins 122 are located closer to the second windows 142 rather than to a midpoint between the windows 141 and 142. The radial positions of the stop pins 122 are outward those of the outer edges of the second windows 142, although the radial positions of the stop pins 122 are radially inward of the outer edges of the first windows 141. More specifically, even the radial positions of the innermost points of the stop pins 122 are still outward of those of the outer edges of the second windows 142.

As shown in FIG. 22, pin mounting holes 154 and 155 are provided on both sides in the rotational direction R1 of the stop pins 122 provided on the rotational direction R2 side of the first windows 141 on the clutch plate 112 and the retaining plate 113. In other words, there are preferably three holes 153 through 155 formed in a row in the rotational direction including a hole 153 in which the stop pin 122 is actually installed. The rotational direction angle between the pin installation holes 155 and 154 is θ11, and the rotational direction angle between the pin installation holes 155 and 153 is θ12. The pin mounting holes 157 are provided on the rotational direction R2 side of the stop pins 122 provided on the rotational direction R1 side of the first windows 141 on the clutch plate 112 and the retaining plate 113. In other words, there are two holes 156 and 157 formed in a row in the rotational direction including a hole 156 in which the stop pin 122 is actually installed. The rotational direction angle between pin installation holes 156 and 157 is θ13. In this embodiment, the sizes of θ11 through θ13 are preferably the same and more preferably are equal or substantially equal to 9 degrees.

(3) Output Rotational Member

As seen in FIG. 19, the output rotational member 103 is provided to receive the torque from the input rotational member 102 via the elastic connection mechanism 104 and to supply the torque to a transmission input shaft. The output rotational member 103 primarily is made of a hub 106. The hub 106 is made of a boss 107 and a flange 108.

The boss 107 is a tube like member placed in the center hole of the clutch plate 112 and the retaining plate 113. The boss 107 forms a spline engagement with a transmission input shaft (not shown) inserted into the center hole. The flange 108 is a circular disk shape part formed integrally with the boss 107 on its outer periphery and extends outward. The flange 108 is located between the clutch plate 112 and the retaining plate 113 in the axial direction. The flange 108 is made of an annular-shaped inner periphery part 108a located at its innermost side, and an outer periphery part 108b provided on its outer periphery side.

Figure 23:
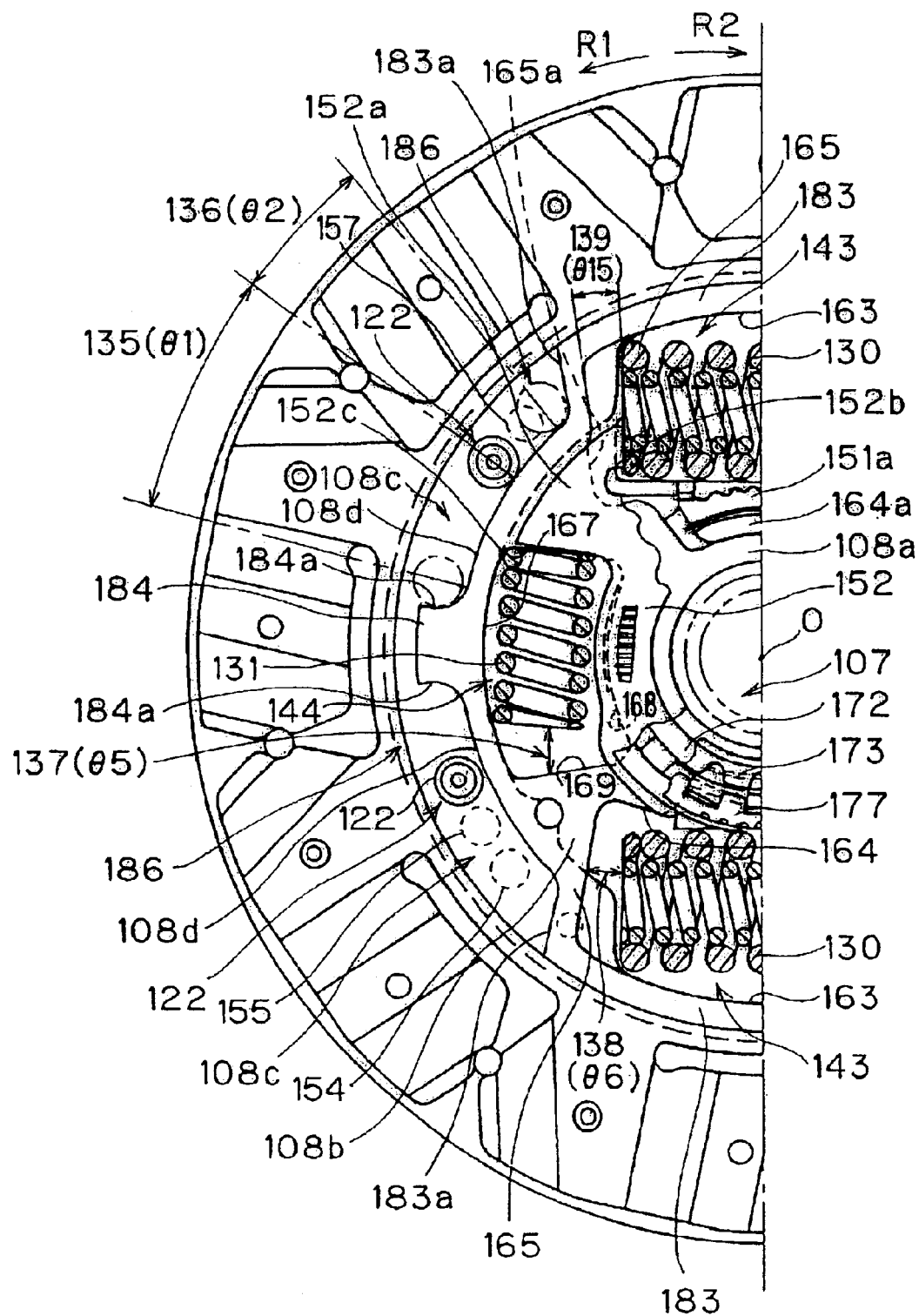
FIG. 23 is an alternate enlarged fragmentary view of FIG. 21 illustrating a partial elevational view of the clutch disk assembly.

As seen in FIG. 21, window openings 143 and 144 are formed in the outer periphery 108b of the flange 108 to correspond with the windows 141 and 142. In other words, multiple, preferably four, window openings 143 and 144 are formed along the circumferential direction in the same radial position as the windows 141 and 142. The pair of window openings 143 located apart from each other in the vertical direction in FIG. 21 and FIG. 23 is called first window openings 143, and the pair of window openings located apart from each other in the horizontal direction in FIG. 21 and FIG. 23 is called second window openings 144. Each window opening 143 is an opening punched through axially and extends in the circumferential direction. As seen in FIG. 23, each window opening 143 has an outer periphery supporting part 163, an inner periphery supporting part 164, and a rotational direction supporting part 165. In an elevational view, the outer periphery supporting part 163 and the inner periphery supporting part 164 are curved in the circumferential direction. The rotational direction supporting part 165 extends substantially straight along the radial direction and, more specifically, the rotational direction supporting part 165 is parallel to a straight line connecting the center of the window opening 143 in the rotational direction and the center O of the clutch disk assembly 1. The rotational direction supporting part 165 on the rotational direction R1 side has a rotational direction concave part 165a formed on the inner periphery side. The rotational direction concave part 165a is slightly indented toward the rotational direction R1 side relative to the part on the outer periphery side. A radius direction concave part 164a is formed in the middle of the inner periphery supporting part 164. The radius direction concave part 164a is indented toward the inside of the radial direction relative to both sides in the rotational direction.

The first windows 141 are shorter than the first window openings 143 in the rotational direction. Consequently, the rotational direction supporting part 147 of first window 141 on the rotational direction R1 side secures a rotational direction gap 139 (θ15) between it and the rotational direction supporting part 165 of the first window opening 143 on the rotational direction R1 side. Also, the rotational direction supporting part 147 of first window 141 on the rotational direction R2 side secures a rotational direction gap 138 (θ6) between it and the rotational direction supporting part 165 of the first window opening 143 on the rotational direction R2 side.

Figure 27:
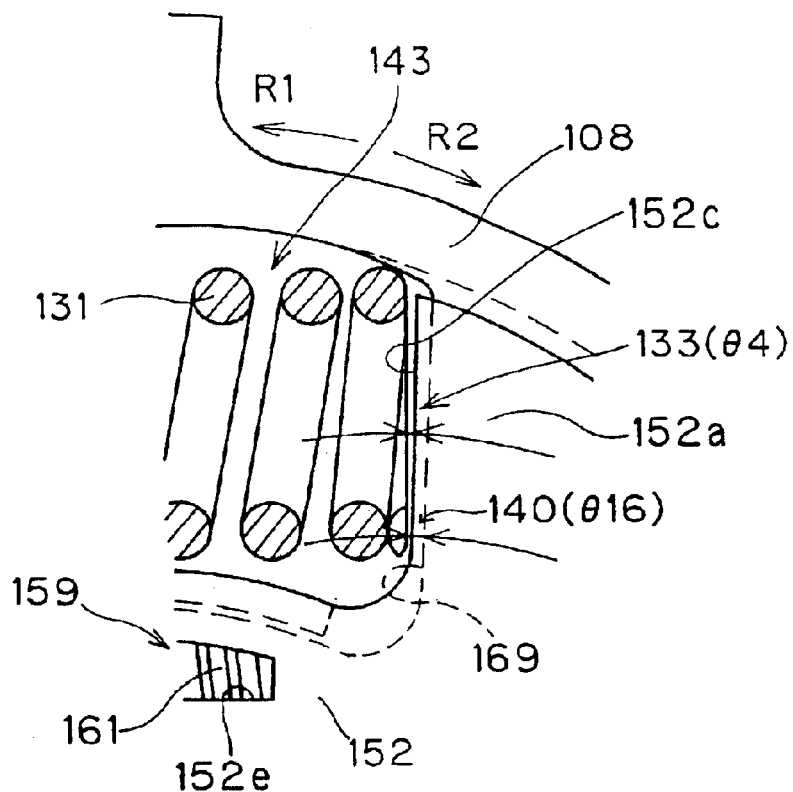
FIG. 27 is a partial elevational view a second elastic member, a flange, and a plate of the clutch disk assembly of FIG. 19 illustrating the torsional angle relationship therebetween.

The second window opening 144 is an opening punched through axially and extends in the circumferential direction. Each window opening 144 has an outer periphery supporting part 167, an inner periphery supporting part 168, and a rotational direction supporting part 169. In an elevational view, the outer periphery supporting part 167 and the inner periphery supporting part 168 are curved along the circumferential direction. The rotational direction supporting part 169 extends substantially straight along the radial direction and, more specifically, the rotational direction supporting part 169 is parallel to a straight line connecting the center of the second window opening 144 in the rotational direction and the center O of the clutch disk assembly 1. The second windows 142 are shorter than the second window openings 144 in the rotational direction. Consequently, as seen in FIG. 27, the rotational direction supporting part 150 of the second window 142 on the rotational direction R2 side secures a rotational direction gap 140 (θ16) between it and the rotational direction supporting part 169 of the second window opening 144 on the rotational direction R2 side. Referring again to FIG. 23, the rotational direction supporting part 150 of the second window 142 on the rotational direction R1 side secures a rotational direction gap 137 (θ5) of a specified angle between it and the rotational direction supporting part 169 of the second window opening 144 on the rotational direction R1 side.

Notches 108c are formed on the outer periphery of the flange 108 for the stop pins 122 to pass through in an axial direction. Each notch 108c is located between each pair of window openings 143 and 144 in the rotational direction. Further, each stop pin 122 is movable in the notch 108c in the rotational direction. The notches 108c are formed in between the radial direction protrusions 183 where the first window openings 143 are formed and the radial direction protrusions 184 on the radial outside of the second window opening 144. In other words, each notch 108c is formed by an outer edge 108d of the flange 108 and the rotational direction surfaces 183a and 184a of the protrusions 183 and 184 respectively. When viewed from the stop pin 122, a first rotational gap 135 (θ1) is defined between the stop pin 122 and the rotational direction surfaces 184a on the rotational direction R1 side, while a second rotational gap 136 (θ2) is defined between the stop pin 122 and the rotational direction surfaces 183a on the rotational direction R2 side. Thus, the stop pin 122, protrusions 183 and 184, and the notch 108c constitute a torsional angle stopper mechanism 186 of the clutch disk assembly 101.

The pin installation holes 153 through 157 on the clutch plate 112 and the retaining plate 113 are provided within the circumferential direction width of the notch 108c. In other words, the notch 108c has a circumferential width that extends beyond the outermost parts of the multiple pin installation holes 153 through 157. As a result, the torsional stopper 186 can be materialized regardless of which pin installation holes are used to install the stop pins 122.

Each protrusion 184 is formed in correspondence with the second window openings 144 and their centers in the rotational direction coincide with each other. However, since the protrusion 184 can have a shorter rotational direction length when compared to the second window 144, the rotational direction surfaces 184a in that case are located inside of the rotational direction supporting parts 169 in the rotational direction. Thus, the notches 108c extend past a portion of the outer periphery side of the second windows 144, so that the stop pins 122 can move to a place radially outward of the second window openings 144. In other words, the stopper mechanisms 186, more specifically the stop pins 122, do not interfere with the second window openings 144 in the rotational direction. As a result, the torsional angle of the torsional angle stopper 186 is larger than that of the conventionally designed clutch disk assemblies.

(4) Elastic Connection Mechanism

The elastic connection mechanism 104 is provided to transmit torque from the input rotational member 102 to the output rotational member 103 and to absorb and attenuate torsional vibrations. The elastic connection mechanism 104 preferably is made of a plurality of elastic members 130 and 131. This embodiment uses four elastic members 130 and 131. Each of the elastic members 130 and 131 are provided in the first window openings 143 and 144 as well as windows 141 and 142. The elastic members 130 and 131 are made of two kinds of elastic members, i.e., the first elastic members 130 placed in the first window openings 143 and the first windows 141, and the second elastic members 131 placed in the second window openings 144 and the second windows 142. The first elastic members 130 are coil springs that extend in the rotational direction; both ends of the coil springs in the rotational direction are supported by both the rotational direction supporting parts 147 of the first windows 141. Therefore, the rotational direction R1 side edge of the first elastic member 130 secures a rotational direction gap 139 (θ15) between the first elastic member 130 and the rotational direction supporting part 165 of the first window opening 143, while the rotational direction R2 side edge of the first elastic member 130 secures a fourth rotational direction gap 138 (θ6) between it and the rotational direction supporting part 165 of the first window opening 143.

The second elastic members 131 are coil springs that extend in the rotational direction and are smaller in the rotational length and the coil diameter, having a smaller spring constant (lower rigidity) compared to the first elastic members 130. Both rotational direction ends of each second elastic member 131 are supported by both rotational direction supporting parts 150 of the second window 142. Therefore, as shown in FIG. 27, the rotational direction R2 side edge of the second elastic member 131 secures a rotational direction gap 140 (θ16) between it and the rotational direction supporting part 150 of the second window opening 144, while, as seen in FIG. 23, the rotational direction R1 side edge of the second elastic member 131 secures a third rotational direction gap 137 (θ5) between it and the rotational direction supporting part 169 of the second window opening 144.

(5) Intermediate Rotating Member

As seen in FIG. 19, an intermediate rotating member 110 is a member provided in such a way as to be able to allow relative rotation between the input rotational member 102 and the output rotational member 103. The intermediate rotating member 110 engages the output rotational member 103 in the rotational direction and forms a second friction generating unit 171 (to be described later) between it and the input rotating member 102. The intermediate rotating member 110 is preferably made of a bush 151 and a plate 152.

Figure 28:
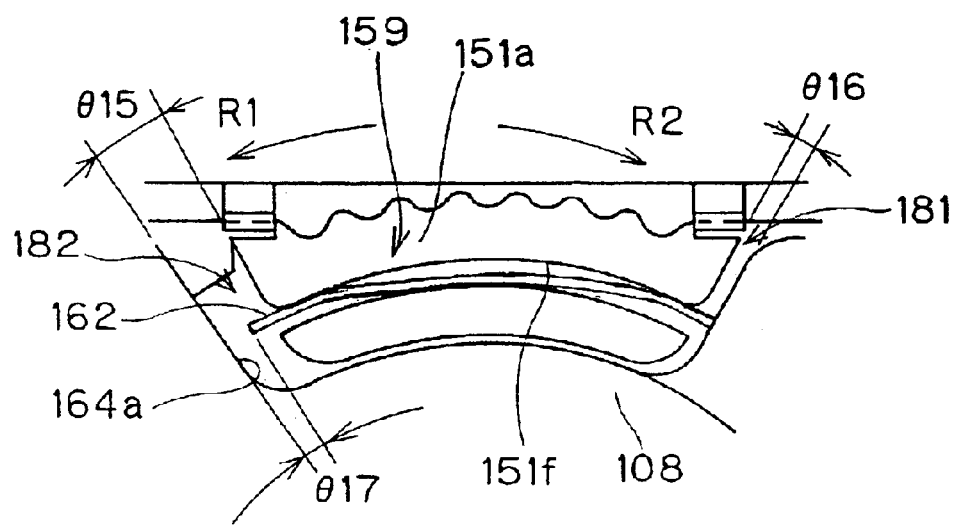
FIG. 28 is a partial elevational view illustrating a first damper mechanism of the clutch disk assembly of FIG. 19.

The bush 151 is an annular member placed between the inner periphery of the clutch plate 112 and the flange 108 and is typically made of a plastic material. The bush 151 extends axially toward the transmission, and has a protrusion 151*a* that extends through the radial direction concave part 164*a* of the first window opening 143. As shown in FIG. 28, the rotational direction length (angle) of the protruding part 151*a* is smaller than the rotational direction length (angle) of the radial direction concave part 164*a*, so that the protruding part 151*a* is movable within the radial direction concave part 164*a* in the rotational direction. In a neutral condition shown in FIG. 28, a rotational direction gap 182 (θ15) is secured between the rotational direction R1 side edge of the protruding part 151*a* and the rotational direction R1 side wall of radial direction the concave part 164*a*, while a rotational direction gap 181 (θ16) is secured between the rotational direction R2 side edge of the protruding part 151*a* and the rotational direction R2 side wall of the radial direction concave part 164*a*. Consequently, the flange 108 and the intermediate member 110 are rotatable to each other within a specified angle, and the protruding part 151*a* and the concave part 164*a* constitute the torsional angle stopper of a first damper mechanism 159 (to be described later).

Referring again to FIG. 19, the plate 152 is a member placed between the flange 108 and the retaining plate 113 and is typically made of sheet metal. The plate 152 engages with the protruding part 151*a* of the bush 151, so that both members 151 and 152 rotate together. As seen in FIG. 23, the protruding parts 152*a* are formed extending radially outward on the outer periphery of the plate 152. A bent tongue 152*b* is formed to extend axially toward the engine side on the edge of each protruding part 152*a* on the rotational direction R2 side. The bent tongue 152*b* is separated from the rotational direction concave part 165*a* of the first window opening 143 by an angle of θ15 in the rotational direction R2, and abuts or is close to the rotational direction R1 side edge of the first elastic member 130. Therefore, the bent tongue 152*b* will be closed in the concave part 165*a* when it moves toward the hub 106 by an angle of θ15 in the rotational direction R1, and supports the rotational R1 side of the first elastic member 130 together with the rotational direction support part 165. Under this condition, the tongue 152*b* is sandwiched between the rotational direction support part 165 of first window opening 143 on the rotational direction R1 side and the edge of the second elastic member 131 on the rotational direction R1 side. Thus, the tongue 152*b* can move away from the flange 108 in the rotational direction R2 side but cannot move toward the rotational direction R1 side.

As seen in FIG. 27, the rotational direction R1 side edge 152*c* of the protruding part 152*a* is provided close to the rotational direction R2 side edge of the second elastic member 131 as shown in FIG. 27, and secures a rotation gap 133 (θ4).

Referring to FIG. 19, as can be seen from the above, the bush 151 and the plate 152 not only abut each other in the axial direction, but also engage each other in the rotational direction to constitute a single member (the intermediate rotating member 110) that rotates as a unit. Since the axial distance between the bush 151 and the plate 152 is larger than the axial thickness of the flange 108, both axial sides of the flange 108 are interposed by the members 151 and 152. Thus, the intermediate rotating member 110 is made of two members, i.e., the bush 151 and the plate 152, and the bush 151 has a protruding part 151*a* that engages with the plate 152. Hence, it is possible to omit the auxiliary pin in the prior art design, resultantly reducing the number of parts and the total cost.

(6) Friction Generating Mechanism

The clutch disk assembly 101 further includes a friction generating mechanism 179 provided for functioning in parallel with the elastic connection mechanism 104. The friction generating mechanism 179 has a first friction generating unit 170 for generating low hysteresis torque and a second friction generating unit 171 for generating high hysteresis torque.

Figure 24:
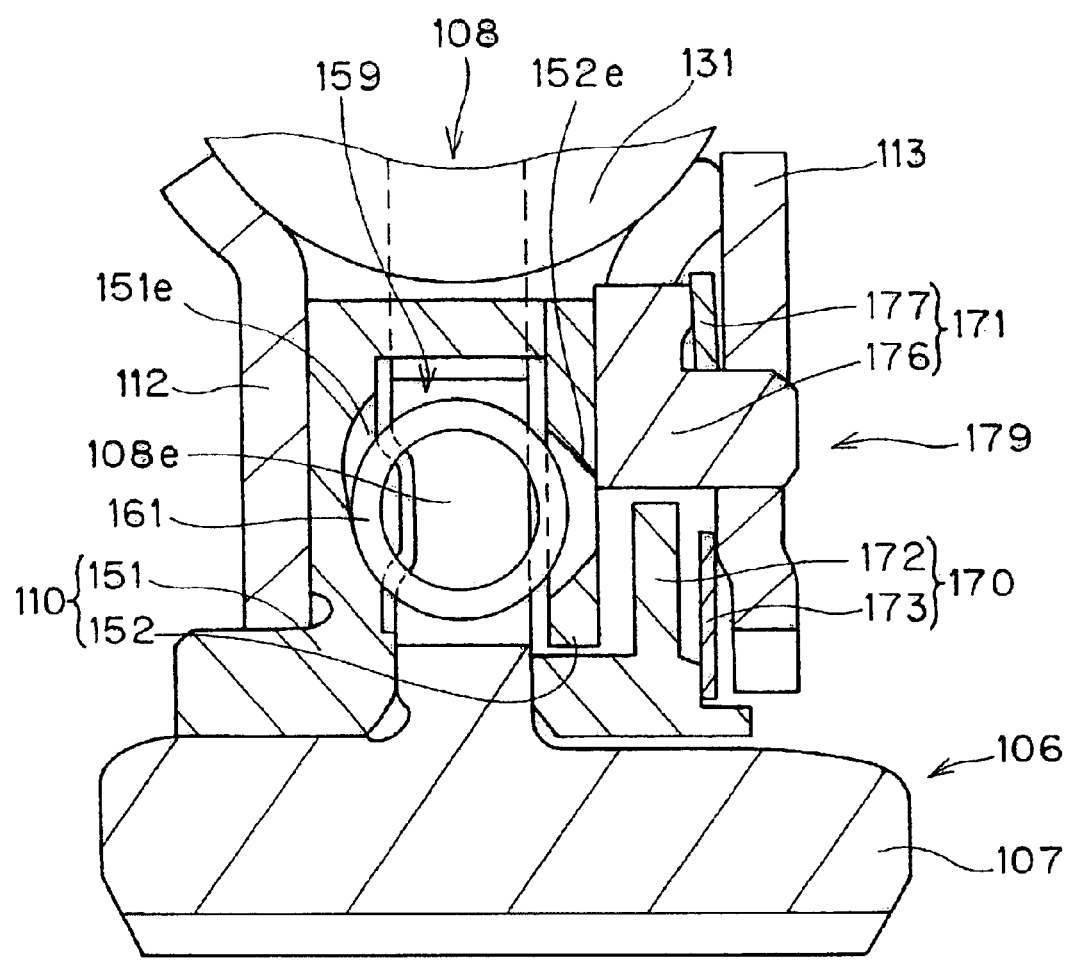
FIG. 24 is an enlarged fragmentary view of FIG. 20 illustrating a vertical cross-section of a friction generating mechanism of the clutch disk assembly.

The first friction generating unit 170 is provided to generate the hysteresis torque in the entire region where the elastic connection mechanism 104 is operating, i.e., on both of the positive and negative sides of the torsional characteristics. As seen in FIG. 24, the first friction generating unit 170 is equipped with a first bush 172 and a first cone spring 173. The first bush 172 and the first cone spring 173 are provided between the inner periphery part 108*a* of the flange 108 and the inner periphery part of the retaining plate 113. The first bush 172 is preferably a washer-like member and has a friction surface that abuts the inner periphery 108*a* of flange 108 on its transmission side in the axial direction in such a way as to be able to slide. The first cone spring 173 is placed axially between the first bush 172 and an inner periphery part of the retaining plate 113. Further, the first cone spring 173 is axially compressed. Due to the structure of the first friction generating unit 170 as described above, the first bush 172 rotates together with the clutch plate 112 and the retaining plate 113 and is pressed against the flange 108 in the axial direction due to the elastic force of the first cone spring 173 and is capable of sliding in the rotational direction.

The second friction generating unit 171 is equipped with a second bush 176 and a second cone spring 177. The second bush 176 and the second cone spring 177 are placed between the center part of the plate 152 and the inner periphery of the retaining plate 113 in the axial direction, in other words, on the radial outer side of the first bush 172 and the first cone spring 173. The second bush 176 has a friction surface that abuts the center part of the plate 152 on its transmission side in the axial direction. The second bush 176 has a protrusion that extends in the axial direction from its annular main body and penetrates into an opening formed in the retaining plate 113. Due to this engagement, the second bush 176 is movable in the axial direction, but is not rotatable relative to the retaining plate 113. The second cone spring 177 is placed axially between the second bush 176 and the inner periphery of the retaining plate 113 and is axially compressed between them. A concave part is formed on the inner periphery of the second bush 176 for the protrusion extending from the first bush 172 to engage therewith in the rotational direction, and this engagement makes it possible for the first bush 172 to rotate together with the second bush 176 and the retaining plate 113. Due to the structure of the second friction generating unit 171 as described above, the second bush 176 rotates together with the retaining plate 113 and the clutch plate 112 are pressed against the intermediate rotating member 110 in the axial direction due to the elastic force of the second cone spring 177 and are capable of sliding in the rotational direction. The hysteresis torque generated by the second friction generating unit 171 is substantially larger (10–20 times larger) than that generated in the first friction generating unit 170.

(7) First Damper Mechanism

Figure 29:
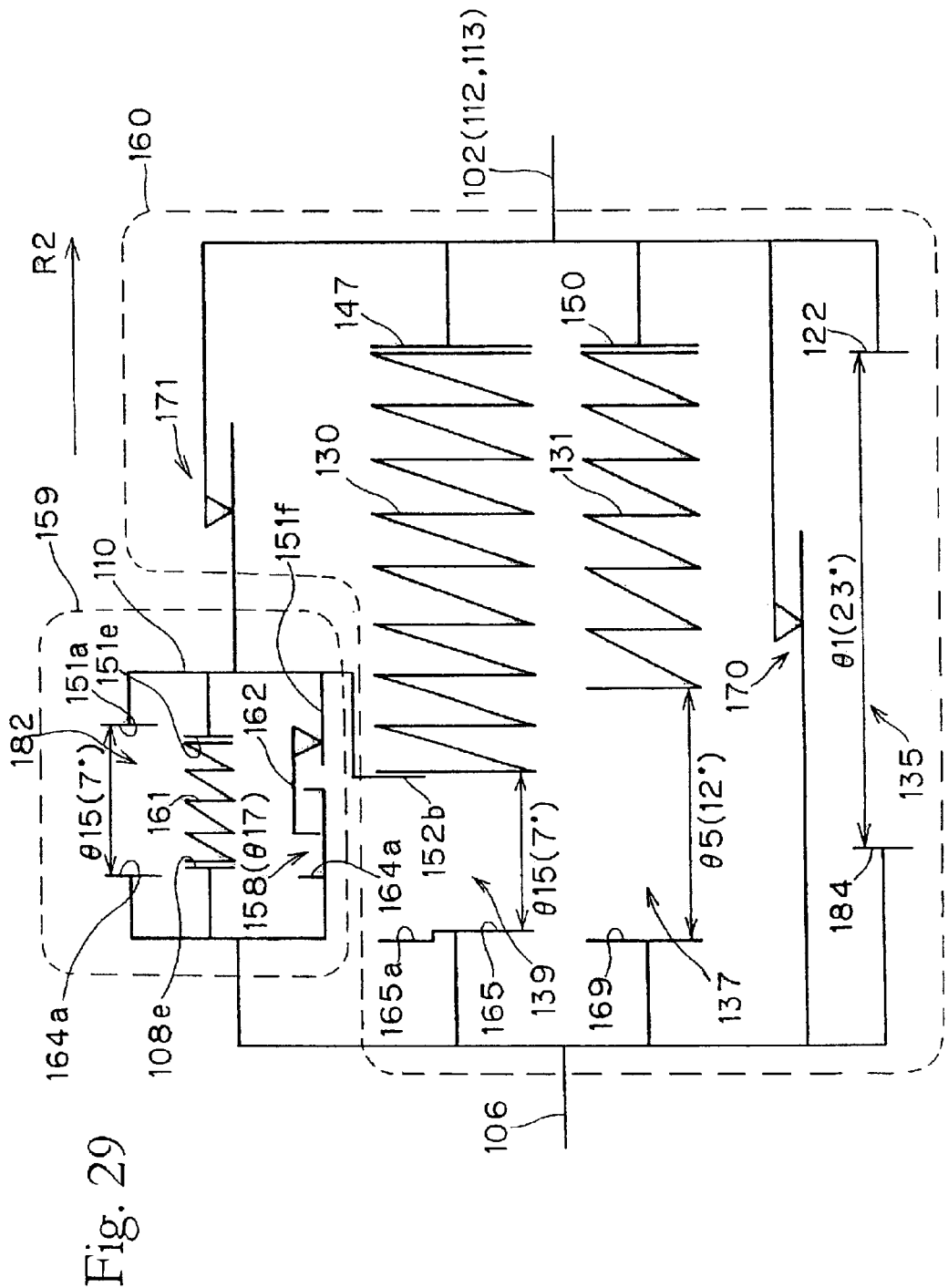
FIG. 29 is a view of a schematic drawing of a damper mechanism of the clutch disk assembly of FIG. 19.

Referring to FIG. 29, the first damper mechanism 159 will be described below. The first damper mechanism 159 is a mechanism that elastically connects the intermediate member 110 with the hub 106 in the rotating direction, and is intended to absorb and attenuate minute torsional vibrations during idling by means of realizing characteristics of a low rigidity in the vicinity of zero angle of the torsional characteristics. In other words, the elastic connection mechanism 104 is a second damper mechanism 160 for absorbing and attenuating torsional vibrations during the normal running of a vehicle.

The first damper mechanism 159 primarily is made of a small coil spring 161 and a plate spring 162. The small coil spring 161 is a member for transmitting a torque between the intermediate rotating member 110 and the hub 106 and for generating a desired rigidity by being compressed in the rotational direction when the two members rotate relatively. The plate spring 162 is a member for generating a friction resistance when the intermediate member 110 and the hub 106 rotate relatively.

The small coil spring 161 is provided inside the second elastic member 131 in the radial direction. Moreover, the coil diameter and free length of the small coil spring 161 are substantially shorter than those of the second elastic member 131 and their center positions match approximately in the rotational direction. Therefore, both ends of the small coil spring 161 in the rotational direction are located inside second elastic member 131 in the rotational direction. The small coil spring 161 is stored inside a window opening 8e of the inner periphery 8a of flange 8 as shown in FIG. 24. In other words, both ends of the small coil spring 161 are supported by both ends of the window opening 8e in the circumferential direction. Moreover, the spring support parts 151e and 152e are provided on both the bush 151 and the plate 152. The spring support parts 151e and 152e are concave parts indented axially outward on the axial inner side surface of each member and support the small spring 161 on its outside in the axial direction and both sides in the rotational direction. In other words, both ends of the small coil spring 161 in the rotational direction are supported by both ends of the spring supports 151e and 152e in the rotational direction. The window opening 108e can be provided connective with the second window opening 144 or independently.

Figure 25:
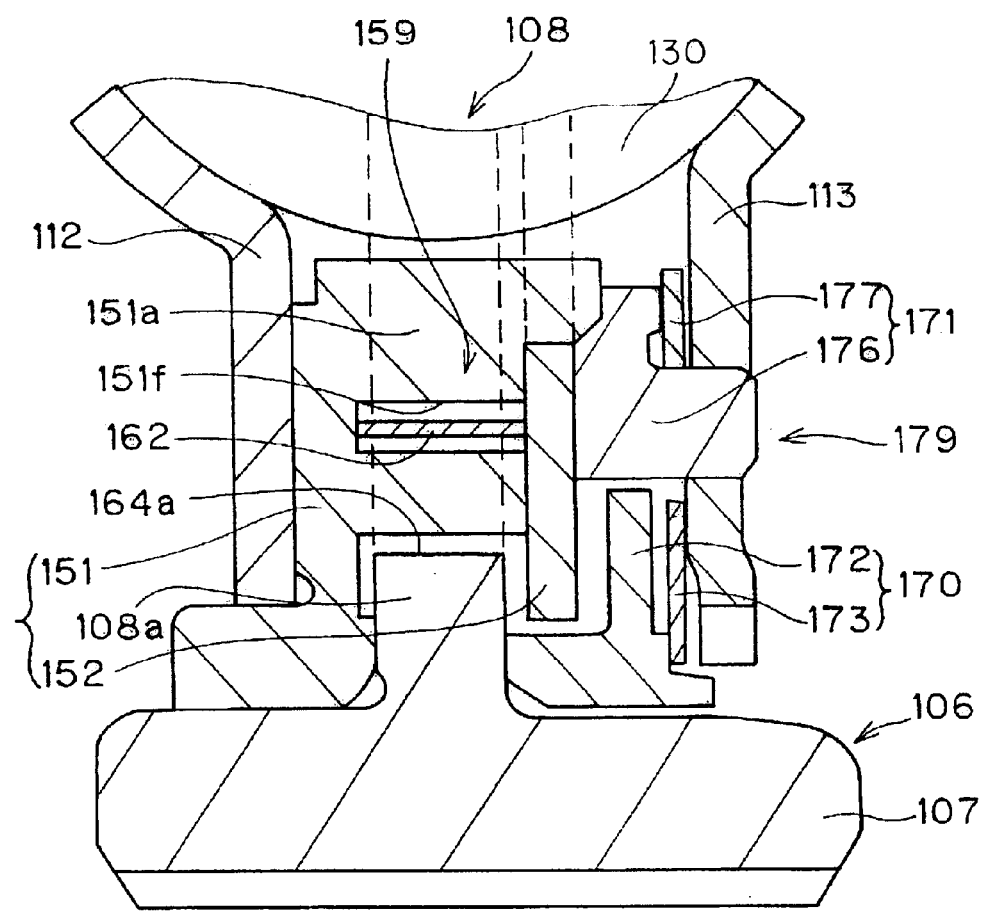
FIG. 25 is an enlarged fragmentary view of FIG. 19 illustrating a vertical cross-section of the friction generating mechanism.
Figure 26:
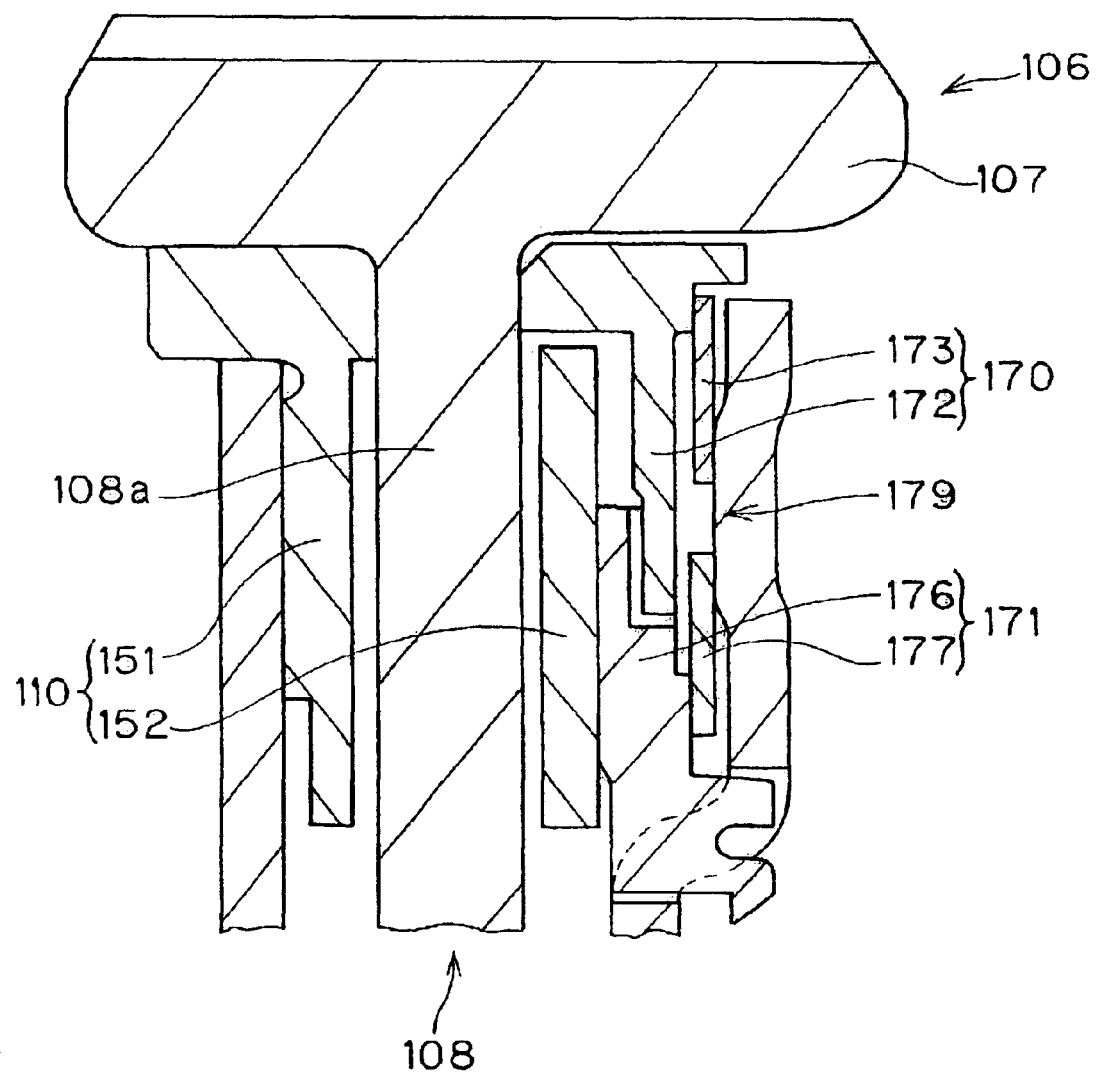
FIG. 26 is an enlarged fragmentary view of FIG. 19 and a vertical cross-section of the friction generating mechanism.

As shown in FIG. 25, the plate spring 162 is provided inside a groove 151f formed on the transmission side (the plate 152 side) in the axial direction of the protruding part 151a of the bush 151. The groove 151f extends in an arc-like shape in the rotational direction as shown in FIG. 28, and both ends thereof open to the rotational direction. The plate spring 162 has an axial height substantially equal to that of the groove 151f and extends along the groove 151f in an arc-like shape in the rotational direction. The plate spring 162 is compressed in the radial direction in the groove 151f. Both ends of the plate spring 162 in the rotational direction are pressed against an outer peripheral side wall of the groove 151f. Further, the middle portion of the plate spring 162 in the rotational direction is pressed against the inner peripheral side wall of the groove 151f. Moreover, the rotational direction length (angle) of the plate spring 162 is greater than the rotational direction length (angle) of the groove 151f, so that both ends or one end of the plate spring 162 is protruding from the groove 151f, i.e., the protruding part 151a in the rotational direction. The rotational direction angle of the plate spring 162 is smaller than the rotational direction angle of the radial direction concave part 164a, and secures a rotational direction gap 158. The torsional angle of the rotational direction gap 158 is $\theta 17$, and the value of $\theta 17$ in this embodiment is preferably 4 degrees.

(8) Rotating Direction Gap

With reference to FIG. 23, the relationships among the various torsional angles of the rotating direction gaps 135 through 137 and others will be described below. It should be noted that specific numerical values shown below are only examples used for the sake of explanation and are not meant to limit the invention.

The first rotational gap 135 represents the total torsional angle on the positive side of the torsional characteristics of the clutch disk assembly 101 and its size is represented by $\theta 1$. The specific numerical value of $\theta 1$ is preferably 23 degrees, but the invention is not limited by the numerical value. The second rotational gap 136 represents the total torsional angle on the negative side of the torsional characteristics of clutch disk assembly 101 and its size is represented by $\theta 2$. The specific numerical value of $\theta 2$ in this embodiment is preferably smaller than $\theta 1$, and more preferably is 13 degrees. Therefore, the sum of $\theta 1$ and $\theta 2$ represents the total torsional angle of the clutch disk assembly 101.

The third rotational gap 137 represents the torsional angle prior to the compression of the second elastic member 131 starts on the positive side of the torsional characteristics, and its torsional angle is represented as $\theta 5$. In this embodiment, the specific value of $\theta 5$ is preferably 12 degrees. The value of the torsional angle of the region where the second elastic member 131 is compressed is $\theta 2$, and $\theta 5$ is $\theta 1-\theta 2$. Consequently, the second stage of the positive side of the torsional characteristics includes the first region (7–12 degrees) where only the first elastic members 130 are compressed and the second region (12–23 degrees) which is a region larger than the first region and in which both the first elastic members 130 and the second elastic members 131 are compressed in parallel, thus achieving the multiple stage feature in the second stage of the positive side of the torsional characteristics.

The fourth rotational direction gap 138 is the torsional angle until the first elastic member 130 starts to be compressed on the negative side of the torsional characteristics. The torsional angle of the fourth rotational direction gap 138 is expressed as $\theta 6$, and the specific value of $\theta 6$ is preferably 9 degrees. If the value of the torsional angle of the region where the first elastic member 130 is compressed is named $\theta 3$, then $\theta 6$ is $\theta 2-\theta 3$. Consequently, the second stage of the negative side of the torsional characteristics includes the third region (2–11 degrees) where only the second elastic members 131 are compressed and the fourth region (11–13 degrees) which is a region larger than the third region and in which both the first elastic members 130 and the second elastic member 131 are compressed in parallel, thus achieving the multiple stage feature in the second stage of the negative side of the torsional characteristics.

A rotational direction gap 139 is secured between the rotational direction supporting part 165 of the first window opening 143 on the rotational direction R1 side and the rotational direction R1 side edge of the first elastic member 130. As seen in FIG. 28, a rotational direction gap 182 is secured between the rotational direction R1 side edge of the radial direction concave part 164a of the flange 108 and the rotational direction R1 side edge of the protruding part 151a of the bush 151. The torsional angles of the rotational direction gap 139 and the rotational direction gap 182 are both θ15 and the specific value of θ15 is preferably 7 degrees in this embodiment. As seen in FIG. 27, a rotational direction gap 140 is secured between the rotational direction supporting part 165 of the first window opening 143 on the rotational direction R2 side and the rotational direction R2 side edge of the first elastic member 130. Referring again to FIG. 28, a rotational direction gap 181 is secured between the rotational direction R2 side edge of the radial direction concave part 164a of the flange 108 and the rotational direction R2 side edge of the protruding part 151a of the bush 151. The torsional angles of rotational direction gap 140 and rotational direction gap 181 are both θ16 and the specific value of θ16 is preferably 2 degrees in this embodiment.

Thus, the operating angle range of the first damper mechanism 159 is from torsion angle 0 degrees to θ15 on the positive side and to θ16 on the negative side as shown in FIG. 29. Moreover, within the operating angle of the first damper mechanism 159, the rigidity is provided primarily by the small coil spring 161, and the small hysteresis torque is obtained by the plate spring 162 slides on the groove 151f of the bush 151.

The rotational direction gap 133 is a rotational direction gap for preventing the torque of the second elastic member 131 from acting on the second friction generating unit 171 on the negative side second stage of the torsional characteristics. The torsional angle of the rotational direction gap 133 is θ4, and the value of θ4 in this embodiment is preferably 4 degrees.

(9) Torsional Characteristics

Figure 30:
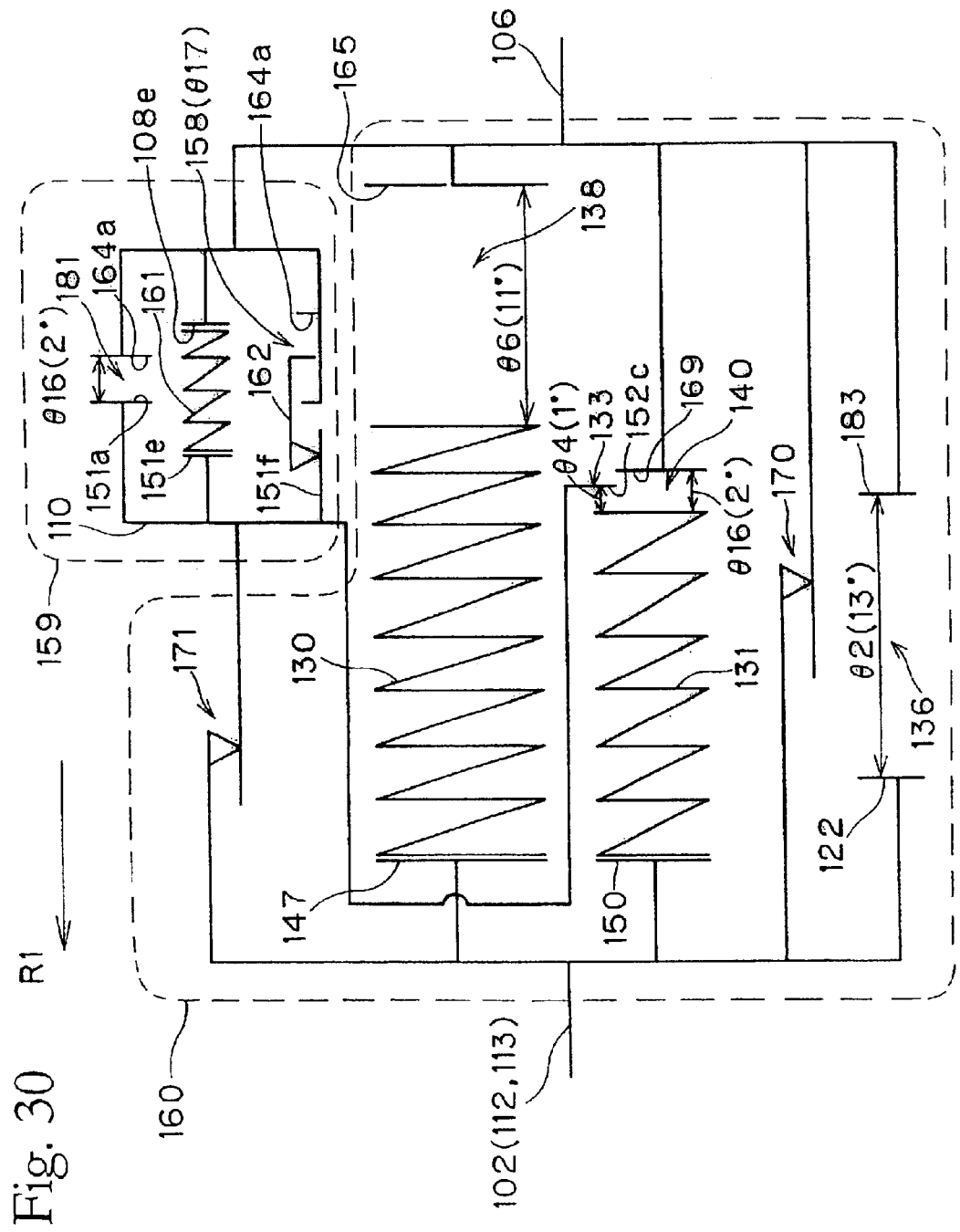
FIG. 30 is a view of a schematic drawing of the damper mechanism of the clutch disk assembly of FIG. 19.
Figure 31:
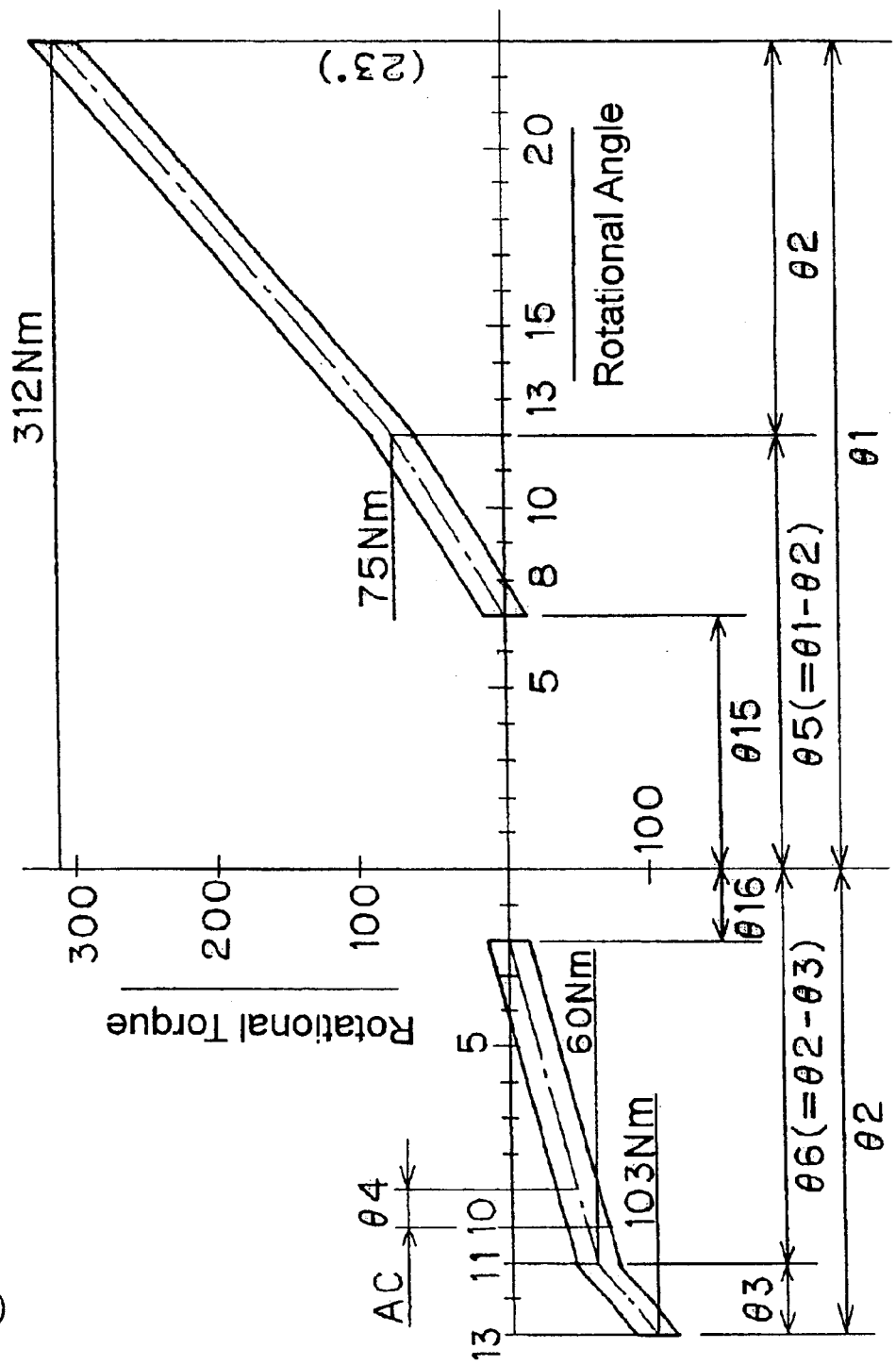
FIG. 31 is a view of a torque characteristic diagram of the clutch disk assembly of FIG. 19.

Next, the torsional characteristics of the clutch disk assembly 101 is described using schematic drawings of the damper mechanism shown in FIG. 29 and FIG. 30 as well as a torsional characteristic diagram shown in FIG. 31. The specific numerical values shown in FIG. 31 are disclosed as examples of those of an embodiment of the present invention and should not be construed to limit the invention.

First, an operation of the positive side region of the torsional characteristics will be described, in which starting from a neutral position shown in FIG. 29, where the input rotational member 102 is fixed, the hub 106 is twisted in the rotational direction R2 (as a result, the input rotational member 102 gets twisted relative to the output rotational member 103 in the rotational direction R1).

In the region where the torsional angle is the smallest, only the first damper mechanism 159 operates. More specifically, the small coil spring 161 is compressed in the rotational direction between the bush 151, the plate 152, and the flange 108. At this time, the plate spring 162 slides over the wall of the groove 151f of the protruding part 151a being pressed by the rotating direction wall of the radial direction concave part 164a. When rotating direction R1 side edge of the concave part 164a abuts the rotational direction R1 side edge of the protruding part 151a, the motion of the first damper mechanism 159 stops. Moreover, when this torsional angle is θ17, the rotating direction support part 165 of the first window opening 143 on the rotational direction R1 side abuts the rotational direction R1 side edge of the first elastic material 130, and the concave part 165a abuts the bent tongue 152b of the plate 152. From thereon, the bent tongue 152b is kept pressed onto the concave part 165a by the rotational direction R1 side edge of the first elastic member 130.

When the torsional angle further increases, only the second damper mechanism 160 operates. In a region where the torsional angle is small, the two first elastic members 130 are compressed. When the absolute value of the torsional angle becomes larger than θ5, the rotational direction support parts 169 of the second window openings 144 on the rotational direction R1 side abut with the side edge of the second elastic members 131 in the rotational direction R1. From thereon, the two first elastic members 130 are compressed in parallel with the two second elastic members 131, thus providing a high rigidity characteristic. Also, the first friction generating unit 170 and the second friction generating unit 171 operate, thus providing a high hysteresis characteristic. In the second friction generating unit 171, the intermediate rotating member 110 rotates together with the flange 108 in the rotational direction R2 as the bent tongues 152b are pressed against the rotational support parts 165 of the first window openings 143 on the R1 side, and slides relative to the clutch plate 112 and the second bush 176.

In the positive side of the torsional characteristics, the bent tongues 152b of the intermediate rotational member 110 are constantly pressed against the rotating direction support part 165 of the first window opening 143 on the rotation direction R1 side by means of the first elastic members 130 when minute torsional vibrations enter the clutch disk assembly 101. Therefore, the intermediate rotating member 110 cannot rotate relative to the flange 108, and the elastic forces of the elastic members 130 and 131 consistently act on the second friction generating unit 171 via the intermediate rotating member 110 even when minute vibrations are being inputted. In other words, when the input rotating member 102 and the output rotating member 103 rotate relative to each other, the second friction generating unit 171 consistently acts and generates high hysteresis torque on the positive side of the torsional characteristics.

Next, an operation of the negative side region of the torsional characteristics will be described, in which, starting from a neutral position shown in FIG. 30, where the input rotational member 102 is fixed, the hub 106 is twisted in the rotational direction R1 (as a result, the input rotational member 102 is twisted relative to the output rotational member 103 in the rotational direction R2). In the region where the torsional angle is the smallest, only the first damper mechanism 159 operates. More specifically, the small coil spring 161 is compressed in the rotational direction between the bush 151, the plate 152, and the flange 108. At this time, the plate spring 162 slides over the wall of the groove 151f of the protruding part 151a being pressed by the rotating direction wall of the radial direction concave part 164a. When rotating direction R2 side edge of the concave part 164a abuts the rotational direction R2 side edge of the protruding part 151a, the motion of the first damper mechanism 159 stops. Moreover, when this torsional angle is θ16, the rotational direction support part 169 of the second window opening 144 on the rotational direction R2 side abuts the rotational direction R2 side edge of the second elastic member 131.

When the torsional angle further increases, only the second damper mechanism 160 operates. In a region where the torsional angle is small, only the two second elastic members 131 are compressed and a lower rigidity is achieved in comparison with the positive side. Also, the first friction generating unit 170 and the second friction generating unit 171 operate, thus providing a high hysteresis characteristic. At this time in the second friction generating unit 171, the intermediate rotating member 110 rotates together with the flange 108 in the rotational direction R1 and slides relative to the second bush 176 as the protruding part 151a of the bush 151 is pressed to rotational direction R2 side edge of the radial direction concave parts 164a. Since the intermediate rotating member 110 rotates together with the hub 106 as described above, the rotational angle θ4 of the rotational direction gap 133 is secured between the rotational direction R2 side edge of the second elastic member 131 and the edge 152c of the plate 152.

When the absolute value of the torsional angle becomes θ6, the rotational direction support parts 165 of the first window openings 143 on the rotational direction R2 side abut with the side edge of the first elastic members 130 in the rotational direction R2. From thereon, the two first elastic members 130 are compressed in parallel with the two second elastic members 131. As a result, high rigidity and high hysteresis torque torsional characteristics are achieved.

As can be seen from the above, the second elastic members 131 are compressed only within the range of torsional angle θ2 (which is smaller than the positive side total angle θ1) in the positive side of the torsional characteristics, the angle compressed on the positive side is equal to the angle compressed on the negative side (negative side total angle). In an alternative embodiment, the angle that the second elastic members 131 are compressed on the positive side can be selected to be smaller than the angle that they are compressed on the negative side (negative side total angle). Such an alternative of choosing the angle of compression of the second elastic members 131 to be no greater than the angle of compression on the negative side (negative side total angle), the second elastic members can be of a low rigidity and a low torque capacity. As a result, the shape of the second elastic member 131 can be made smaller than that of the first elastic member 130 as mentioned before, thus making it easier to place the second elastic member 131 radially inside the operating range of the stop pin 122.

Next, with reference to a torsional diagram shown in FIG. 31, the torsional characteristics will be described for various torsional vibrations entering clutch disk assembly 1. When a torsional vibration with large amplitudes such as the forward/backward vibration of a vehicle occurs, the torsional characteristics go through repetitive variations over both the positive and negative sides. In this case, the forward/backward vibrations will be attenuated quickly through hysteresis torque that develops on both the positive and negative sides.

Next, let us assume minute torsional vibrations enter the clutch disk assembly 101 resulting from the engine combustion fluctuations during a deceleration period accompanying engine braking. At this time, the load on the elastic member 131 does not act on the plate 152, i.e., the intermediate rotating member 110, for minute torsional vibrations within the torsional angle θ4, so that intermediate rotating member 110 develops neither any relative rotation in relation to the plates 112 and 113 in the second friction generating part 171, nor any slide on the clutch plate 112 and the second bush 176. In other words, hysteresis torque (hysteresis torque by means of the first friction generating unit 170) is much smaller than the hysteresis torque on the negative side, and is obtained in the range of the torsional angle θ4. The hysteresis torque within θ4 should preferably be in the range of 1/10 of the hysteresis torque of the total range. As can be seen from the above, the vibration and noise level during a deceleration period accompanying engine braking can be substantially reduced as a rotational gap is provided for preventing the second friction generating unit 171 from operating within a specified angle on the negative side of the torsional characteristics.

Since a rotational direction gap for preventing the second friction generating unit 171 from operating within a specified angle is not provided on the positive side of the torsional characteristics, the noise and vibration performance in the vicinity of resonance rpm does not deteriorate, for example, on a FF car, in which it is rather difficult to eliminate resonance peaks completely from the practical rpm range. Since rotational gaps are provided for preventing the friction mechanism from operating within a specified angle only on one of the positive and negative sides of the torsional characteristics, the noise and vibration performances in both acceleration and deceleration improve. As described above, the damper mechanism according to this invention not only uses different torsional rigidities on the positive and negative sides of the torsional characteristics, but also has a structure that prevents high hysteresis torque against minute torsional vibrations on one side of the torsional characteristics, preferable torsional characteristics can be achieved as a whole.

Let us also assume that minute torsional vibrations enter the clutch disk assembly 101 during idling. In such a case, only the first damper mechanism 159 operates to provide low rigidity and low hysteresis characteristics. Consequently, the torsional vibrations are absorbed and attenuated, thus preventing odd noises during idling. In particular, the plate spring 162, which is a friction generating mechanism, does not operate for minute torsional vibrations of torsional angles less that θ17, even if the phenomena are within the first stage region of the torsional characteristics, so that hysteresis will be even smaller. As a consequence, a super low hysteresis or a no-hysteresis condition is achieved within the range of θ17 in minute torsional vibrations during idling, while a slightly larger, in other words, intermediate hysteresis can be achieved on both sides of the condition.

Due to the fact that the plate spring 162 is provided in the groove 151f of the bush 151 in the first damper mechanism 159 in order to materialize friction resistance generating mechanism, the following advantages are available:

(1) Since a single plate spring is used to constitute the friction generating mechanism, the number of parts is minimized and a simpler structure is achieved.

(2) Since the plate spring is provided within the groove of a related member, a space saving structure is achieved.

(3) Since the load and friction coefficient are dependent on the plate spring alone, the friction setting is easier.

(4) Since the load is generated in the radius direction by means of the use of the plate spring, the structure is simpler compared to the conventional design wherein the load is generated in the axial direction.

(5) The size of the super low hysteresis generating region in the first stage region can be adjusted by simply changing the rotational direction length of the plate spring.

(6) While the activation of the second stage spring in the conventional design develops noise when an additional load is applied during idling by activating power steering or turning on lights, the present embodiment prevents the noise development by means of generating a sliding hysteresis torque with the plate spring.

(9) Other Embodiments

The structure of the clutch disk assembly to which this invention is applied is not limited to the embodiment described above. For example, the invention can be applied to a structure connected by a damper where the flange and the boss of the hub are separated.

The damper based on this invention can be applied to mechanisms other than the clutch disk assembly. For example, it can be applied to a damper mechanism elastically connecting two flywheels in the rotational direction as well.

Effect of the Invention

In this damper disk assembly, the first elastic members are compressed to provide a high rigidity characteristic on the positive side (acceleration side) of the torsional characteristics and the second elastic members are compressed to provide a low rigidity characteristic on the negative side (deceleration side) of the torsional characteristics. As a result, it is possible to suppress the fluctuations in the rotating speed when passing through the resonance point on the positive side of the torsional characteristics, while it is possible to achieve a good attenuation ratio for the entire range on the negative side of the torsional characteristics.

In particular, the torsional angle stoppers are located on the outside of the second elastic members in the radial direction and the pin members are movable toward the outer periphery of the second elastic members. In other words, the torsional angle stoppers are not located between the first elastic members and the second elastic members in the rotational direction, so that it is easy to achieve a wide torsional angle for the damper.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2002-166961 and 2002-364318. The entire disclosures of Japanese Patent Application Nos. 2002-166961 and 2002-364318 are hereby incorporated herein by reference.

Wile only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A damper disk assembly comprising:
   a pair of first circular disk members being affixed to and axially opposing each other;
   a second circular disk member being arranged between said pair of first circular disk members, said second circular disk member being rotatable relative to said pair of first circular disk members;
   first elastic members being configured to connect elastically said first circular disk members with said second circular disk member in a rotating direction;
   second elastic members being configured to connect elastically said first circular disk members with said second circular disk member in the rotating direction, said second elastic members having a lower rigidity than said first elastic members, said second elastic members being arranged between said first elastic members in the rotating direction;
   pin members being configured to affix said pair of first circular disk members together, said pin members being provided on an outer periphery of said second circular disk member to form torsional angle stoppers to limit relative rotation between said first circular disk members and said second circular disk member, radial positions of said torsional angle stoppers being outward that of said second elastic members, said pin members being movable radially outside of and relative to said second elastic members; and
   a positive side of torsion characteristics including,
      a first region, only said first elastic members being compressed therein, and
      a second region having a larger torsion angle relative to said first region, and said first elastic members and said second elastic members being compressed in parallel therein.

2. The damper disk assembly according to claim 1 further comprising,
   an intermediate rotating member that frictionally engages said pair of first circular disk members; and
   a low rigidity elastic member that is arranged radially inside of said second elastic member and connects said intermediate rotating member with said second circular disk member in the rotating direction.

3. The damper disk assembly according to claim 1, wherein
   a negative side of said torsion characteristics comprises,
      a third region, in which only said second elastic members are compressed, and
      a fourth region that has a larger torsion angle relative to said third region, and in which said first elastic members and said second elastic members are compressed in parallel.

4. The damper disk assembly according to claim 3 further comprising,
   a friction generating mechanism comprising,
      a friction generating unit that is configured to generate a specified friction, and
      a friction suppressing unit that prevents said friction generating unit from operating in a minute torsion angle range on said negative side of said torsion characteristics.

5. The damper disk assembly according to claim 4 further comprising,
   an intermediate rotating member that frictionally engages said pair of first circular disk members; and
   a low rigidity elastic member that is arranged radially inside of said second elastic member and connects said intermediate rotating member with said second circular disk member in the rotating direction.

6. The damper disk assembly according to claim 5 wherein said intermediate rotating member has a supporting part that supports circumferential ends of said low rigidity elastic member in the rotating direction.

7. The damper disk assembly according to claim 6 further comprising a friction member that generates friction when said intermediate rotating member rotates relative to said second circular disk member.

8. The damper disk assembly according to claim 7 wherein said friction member is a spring member.

9. The damper disk assembly according to claim 8 wherein said friction member is a plate spring.

10. The damper disk assembly according to claim 9, wherein a rotational direction gap is provided in order to prevent said friction member from operating within the range of relative rotation between said intermediate rotating member and said second circular disk member.

11. The damper disk assembly according to claim 1 further comprising,
a friction generating mechanism comprising,
a friction generating unit that is configured to generate a specified friction, and
a friction suppressing unit that prevents said friction generating unit from operating in a minute torsion angle range on a negative side of said torsion characteristics.

12. The damper disk assembly according to claim 11 further comprising,
an intermediate rotating member that frictionally engages said pair of first circular disk members; and
a low rigidity elastic member that is arranged radially inside of said second elastic member and connects said intermediate rotating member with said second circular disk member in the rotating direction.

13. A damper disk assembly comprising:
a pair of first circular disk members being affixed to and axially opposing each other;
a second circular disk member being arranged between said pair of first circular disk members, said second circular disk member being rotatable relative to said pair of first circular disk members;
first elastic members being configured to connect elastically said first circular disk members with said second circular disk member in a rotating direction;
second elastic members being configured to connect elastically said first circular disk members with said second circular disk member in the rotating direction, said second elastic members having a lower rigidity than said first elastic members, said second elastic members being arranged between said first elastic members in the rotating direction; and
pin members being configured to affix said pair of first circular disk members together, said pin members being provided on an outer periphery of said second circular disk member to form torsional angle stoppers to limit relative rotation between said first circular disk members and said second circular disk member, radial positions of said torsional angle stoppers being outward that of said second elastic members, said pin members being movable radially outside of and relative to said second elastic members, said pin members being movable to and past circumferential ends of said second elastic members in a direction toward opposite circumferential ends of said second elastic members.

14. The damper disk according to claim 13, wherein
a negative side of said torsion characteristics comprises,
a third region, in which only said second elastic members are compressed, and
a fourth region that has a larger torsion angle relative to said third region, and in which said first elastic members and said second elastic members are compressed in parallel.

15. The damper disk assembly according to claim 14 further comprising,
a friction generating mechanism comprising,
a friction generating unit that is configured to generate a specified friction, and
a friction suppressing unit that prevents said friction generating unit from operating in a minute torsion angle range on said negative side of said torsion characteristics.

16. The damper disk assembly according to claim 15 further comprising,
an intermediate rotating member that frictionally engages said pair of first circular disk members; and
a low rigidity elastic member that is arranged radially inside of said second elastic member and connects said intermediate rotating member with said second circular disk member in the rotating direction.

17. The damper disk assembly according to claim 14 further comprising,
an intermediate rotating member that frictionally engages said pair of first circular disk members; and
a low rigidity elastic member that is arranged radially inside of said second elastic member and connects said intermediate rotating member with said second circular disk member in the rotating direction.

18. The damper disk assembly according to claim 13 further comprising,
an intermediate rotating member that frictionally engages said pair of first circular disk members; and
a low rigidity elastic member that is arranged radially inside of said second elastic member and connects said intermediate rotating member with said second circular disk member in the rotating direction.

19. The damper disk assembly according to claim 18, wherein
said pair of first circular disk members have first windows in which said first elastic members are arranged, and second windows arranged between said first windows in said rotational direction, said second elastic members are arranged in said second windows, and
said second circular disk member has first window openings in which said first elastic members are arranged, and second window openings arranged between said first windows openings in said rotational direction, said second elastic members are arranged in said second window openings.

20. The damper disk assembly according to claim 19, wherein
a distance between said first and second windows on a first rotational side of said second windows is not equal to a distance between first and second windows on a second rotational side of said second windows opposite said first rotational side.

21. The damper disk assembly according to claim 18, wherein
said intermediate rotating member is arranged non-rotatably from a neutral position in a positive rotation direction with said second circular disk member and rotatably from said neutral position in a negative rotation direction.

22. The damper disk assembly according to claim 18, further comprising
a friction mechanism configured to operate in parallel with said first and second elastic members.

23. The damper disk assembly according to claim 22, wherein said friction mechanism comprises,
a first friction generating unit configured to generate hysteresis torque in both positive and negative rotational directions
a second friction generating unit configured to generate hysteresis torque, said second friction generating unit being prevented from generating torque within a specified angle in a negative side of torsional characteristics.

24. The damper disk assembly according to claim 23, wherein
hysteresis torque generated by said second friction generating unit is ten to twenty times larger than that generated by said first friction generating unit.

25. A damper disk assembly comprising:
a pair of first circular disk members being affixed to and axially opposing each other;
a second circular disk member being arranged between said pair of first circular disk members, said second circular disk member being rotatable relative to said pair of first circular disk members;
first elastic members being configured to connect elastically said first circular disk members with said second circular disk member in a rotating direction;
second elastic members being configured to connect elastically said first circular disk members with said second circular disk member in the rotating direction, said second elastic members having a lower rigidity than said first elastic members, said second elastic members being arranged between said first elastic members in the rotating direction;
pin members being configured to affix said pair of first circular disk members together, said pin members being provided on an outer periphery of said second circular disk member to form torsional angle stoppers to limit relative rotation between said first circular disk members and said second circular disk member, radial positions of said torsional angle stoppers being outward that of said second elastic members, said pin members being movable radially outside of and relative to said second elastic members; and
a friction generating mechanism including,
a friction generating unit being configured to generate a specified friction, and
a friction suppressing unit being configured to prevent said friction generating unit from operating in a minute torsion angle range on a negative side of torsion characteristics.

26. The damper disk assembly according to claim 25 further comprising,
an intermediate rotating member that frictionally engages said pair of first circular disk members; and
a low rigidity elastic member that is arranged radially inside of said second elastic member and connects said intermediate rotating member with said second circular disk member in the rotating direction.

* * * * *